US011053999B2

(12) United States Patent
Campagna

(10) Patent No.: US 11,053,999 B2
(45) Date of Patent: Jul. 6, 2021

(54) ADJUSTABLE ANGLE GEAR

(71) Applicant: Crestron Electronics, Inc., Rockleigh, NJ (US)

(72) Inventor: Michael Campagna, Woodcliff Lake, NJ (US)

(73) Assignee: Crestron Electronics, Inc., Rockleigh, NJ (US)

( * ) Notice: Subject to any disclaimer, the term of this patent is extended or adjusted under 35 U.S.C. 154(b) by 0 days.

(21) Appl. No.: 16/724,621

(22) Filed: Dec. 23, 2019

(65) Prior Publication Data

US 2020/0123850 A1    Apr. 23, 2020

Related U.S. Application Data

(63) Continuation of application No. 15/268,089, filed on Sep. 16, 2016, now Pat. No. 10,513,885.

(60) Provisional application No. 62/219,522, filed on Sep. 16, 2015.

(51) Int. Cl.
| | |
|---|---|
| *F16H 55/08* | (2006.01) |
| *F16H 1/04* | (2006.01) |
| *F16H 1/00* | (2006.01) |
| *E06B 7/096* | (2006.01) |
| *E06B 9/50* | (2006.01) |
| *E06B 9/42* | (2006.01) |
| *E06B 9/56* | (2006.01) |

(52) U.S. Cl.
CPC .............. *F16H 1/006* (2013.01); *F16H 1/04* (2013.01); *F16H 55/0813* (2013.01); *E06B 7/096* (2013.01); *E06B 9/42* (2013.01); *E06B 9/50* (2013.01); *E06B 9/56* (2013.01)

(58) Field of Classification Search
CPC .... F16H 1/006; F16H 35/008; F16H 55/0813; F16H 1/04
See application file for complete search history.

(56) References Cited

U.S. PATENT DOCUMENTS

| | | | |
|---|---|---|---|
| 305,714 A | 9/1884 | Schulze-Berge | |
| 642,423 A | 1/1900 | Brodie | |
| 1,196,268 A | 8/1916 | Noel | |
| 1,348,630 A * | 8/1920 | Custenborder | ........... F16D 3/18 74/385 |
| 1,499,934 A | 7/1924 | Klein | |

(Continued)

FOREIGN PATENT DOCUMENTS

DE           4317218 C1 *  6/1994  ............... F16D 3/18

*Primary Examiner* — Bobby Rushing, Jr.
(74) *Attorney, Agent, or Firm* — Crestron Electronics, Inc.

(57) ABSTRACT

A gear includes a circular base having a front surface that includes an inner region and an outer region that surrounds the inner region. The circular base is rotatable about a central axis. Plural gear teeth are arranged in a same row and extend outward from the outer region of the front surface and are evenly spaced from each other along plural locations on the outer region. Each gear tooth has a cross-sectional width that decreases with decreasing distance from the central axis, and has an outer shape configured to permit any one of the gear teeth in the row to contact and directly mesh with any gear tooth in a corresponding row of gear teeth of a substantially identical gear for any gear angle within a predefined range of gear angles between the central axis of the gear and the central axis of the substantially identical gear.

14 Claims, 28 Drawing Sheets

(56) References Cited

U.S. PATENT DOCUMENTS

| | | |
|---|---|---|
| 1,854,586 A | 4/1932 | Hyer |
| 2,316,243 A | 10/1943 | Hubbard |
| 2,346,507 A | 4/1944 | Quinn |
| 2,397,003 A | 3/1946 | Hambelton |
| 3,983,951 A | 10/1976 | Guerra |
| 5,010,940 A | 4/1991 | Marocco |
| 5,129,275 A | 7/1992 | Park |
| 5,569,090 A | 10/1996 | Hoskins et al. |
| 5,846,135 A | 12/1998 | Hoskins et al. |
| 9,027,441 B2 | 5/2015 | Gewirtz |
| 2004/0159172 A1 | 8/2004 | Barkdoll |
| 2005/0288144 A1 | 12/2005 | Wang et al. |
| 2006/0108080 A1 | 5/2006 | Garrigues |
| 2010/0043580 A1 | 2/2010 | Bernier |
| 2010/0132495 A1 | 6/2010 | Bernier |
| 2014/0007722 A1 | 1/2014 | Urgenc |

* cited by examiner

ADJUSTABLE ANGLE GEAR

CROSS-REFERENCE TO RELATED APPLICATIONS

This application is a continuation of U.S. application Ser. No. 15/268,089, filed Sep. 16, 2016, which claims the benefit of the filing date of U.S. Provisional Patent Application No. 62/219,522, filed Sep. 16, 2015, the disclosures of which are incorporated herein by reference.

BACKGROUND OF THE INVENTION

Technical Field

The present embodiments relate to gearing and, more particularly, to gears configured to mesh with other gears at a range of gear angles.

Background Art

In many applications, it is desirable to be able provide gears that are capable of meshing with each other over a range of gearing intersection angles. For example, motor driven window roller shades typically need to be placed with the end of one shade close to the end of another shade to avoid having gaps that can permit light to enter. Therefore, instead of driving each roller shade with its own motor, a single motor is connected to an end of one of the roller shades to directly drive that shade, and an adjoining roller shade is driven by a meshing a gear attached to the other end of the first roller shade with a gear attached to the adjacent end of the next roller shade. In this manner, two or more roller shades may be driven by a single motor.

In some applications, the adjacent roller shades are arranged along a straight line. However, in other applications, each roller shade may be arranged at angle with respect to its adjacent shade. Therefore, each such arrangement could require specific pairs of gears that mesh at angles different than those required by another arrangement. To avoid the cost of making a particular set of gears for each application, it is desirable to provide a pair of gears that can mesh at a range of angles.

Moreover, at the time of installation, there may be minor differences between the angles at which the roller shades are designed to intersect and the actual angles at which they intersect. It is therefore further desirable to provide a pair of gears that are suitable for use in the presence of such differences.

Conventional spur gears have a driving shaft and a driven shaft with a plurality of teeth, respectively, for gearing with each other in parallel so that only the ratio of rotation and the direction of the rotation are changeable. However, the gearing intersection angle of the rotation of the gears is determined when the gears are designed and manufactured. Once the gearing intersection angle is determined, the angle of the rotation cannot change. That is, the gearing intersection angle is not variable.

To provide a variable gearing intersection angle, some prior systems have used a pair of semi-spherical gears. The driving shaft and the driven shaft are each provided with a semi-spherical body member having gear teeth and grooves which are longitudinally and radially arranged so that the gears may engage at any of a range of intersection angles. However, the shape of semi-spherical gears does not permit the ends of the roller shades to be placed sufficiently close to each other. Additionally, the size needed to provide sufficient torque to sequentially drive several roller shades may further increase the size of the gears needed.

As an example, involute gears are some of the most widely used gears in industry. In an involute gear, the profiles of the teeth are involutes of a circle. The contact between two mating involute gear teeth occurs at a single instantaneous point where two involutes of the same spiral hand meet and moves along a fixed plane of contact irrespective of the center-to-center distance of the gears. Thus involute gears can handle center shifts and provide greater assembly flexibility. Moreover, the contact surface between the gears is always perpendicular to the plane of contact, thus helping reduce torque variation.

It is therefore desirable to provide gears that can mesh at any angle within a desired range of angles yet are capable of, for example, minimizing the separation between the ends of a pair of motorized roller shades.

SUMMARY OF THE INVENTION

It is to be understood that both the general and detailed descriptions that follow are exemplary and explanatory only and are not restrictive.

DISCLOSURE OF INVENTION

In accordance with an aspect, a gear comprises (a) a circular base having a surface that includes an inner region and an outer region; and (b) a gear tooth extending outward from the outer region of the surface, a shape of the gear tooth being defined by a varying cross-sectional profile, wherein starting from a first profile that is in a plane parallel to the surface of the circular base and extending outward from a center of the circular base, each location on the first profile is rotated about a corresponding axis while traversing a path defined by a corresponding imaginary ray extending from the center of the circular base to that location in the first profile, the corresponding axis being tangential to an imaginary circle that encompasses the inner region of the surface and perpendicular to the corresponding imaginary ray.

According to a further aspect, a gear comprises (a) a circular base having a surface that includes a planar inner region and an outer region that curves away from the inner region; and (b) a plurality of gear teeth extending outward from the outer region of the surface and being evenly spaced apart from each other along a plurality of locations on the outer region of the surface, the shape of each gear tooth being defined by a varying cross-sectional profile, wherein starting from a first profile that is in a plane parallel to the surface of the circular base and extending outward from a center of the circular base, each location on the first profile is rotated about a corresponding axis while traversing a path defined by a corresponding imaginary ray extending from the center of the circular base to that location in the first profile, the corresponding axis being tangential to an imaginary circle that encompasses the inner region of the surface and perpendicular to the corresponding imaginary ray.

According to another aspect, a gear system comprises (a) first and second gears, each including (i) a circular base having a surface that includes an inner region and an outer region and that is rotatable about a central axis that is perpendicular to a center of the surface and (ii) a gear tooth extending outward from the outer region of the surface, a shape of the gear tooth being defined by a varying cross-sectional profile, wherein starting from a first profile that is in a plane parallel to the surface of the circular base and extending outward from a center of the circular base, each location on the first profile is rotated about a corresponding axis while traversing a path defined by a corresponding imaginary ray extending from the center of the circular base to that location in the first profile, the corresponding axis being tangential to an imaginary circle that encompasses the inner region of the surface and perpendicular to the corresponding imaginary ray; (b) a first pivot coupled to the first gear such that the entire first gear is movable in a same direction at least within a first range of angles about the first pivot; and (c) a second pivot coupled to the second gear such that the entire second gear is movable in a same direction at least within a second range of angles about the second pivot; wherein the first and second pivots are arranged relative to each other and relative to first and second gears, respectively, such that for any angle within the first range of angles, the gear tooth of the first gear meshes with the gear tooth of the second gear at a corresponding angle within the second range of angles.

According to yet another aspect, a gear system comprises (a) first and second gears, each including (i) a circular base having a surface that includes an inner region and an outer region and that is rotatable about a central axis that is perpendicular to a center of the surface, and (ii) a plurality of gear teeth extending outward from the outer region of the surface and being evenly spaced apart from each other along a plurality of locations on the outer region of the surface, the shape of each gear tooth being defined by a varying cross-sectional profile, wherein starting from a first profile that is in a plane parallel to the surface of the circular base and extending outward from a center of the circular base, each location on the first profile is rotated about a corresponding axis while traversing a path defined by a corresponding imaginary ray extending from the center of the circular base to that location in the first profile, the corresponding axis being tangential to an imaginary circle that encompasses the inner region of the surface and perpendicular to the corresponding imaginary ray; (b) a first pivot coupled to the first gear and located tangential to the imaginary circle of the first gear at a first distance from the central axis of the first gear such that the entire first gear is movable in a same direction at least within a first range of angles about the first pivot; and (c) a second pivot parallel to the first pivot, the second pivot being coupled to the second gear and located tangential to the imaginary circle of the second gear at a second distance from the central axis of the second gear such that the entire second gear is movable in a same direction at least within a second range of angles about the second pivot; wherein a distance between the first pivot and the second pivot is fixed, and a first angle formed between the inner region of the surface of the first gear and a mid-plane perpendicular to and bisecting an imaginary line extending from the first pivot to the second pivot, and a second angle formed between the inner region of the surface of the second gear and the mid-plane, each have a same value, so that for any angle within the first range of angles, the gear tooth of the first gear meshes with the gear tooth of the second gear at a corresponding angle within the second range of angles.

BRIEF DESCRIPTION OF DRAWINGS

The accompanying figures further illustrate the present embodiments.

The components in the drawings are not necessarily drawn to scale, emphasis instead being placed upon clearly illustrating the principles of the present embodiments. In the drawings, like reference numerals designate corresponding parts throughout the several views.

Figure 1:
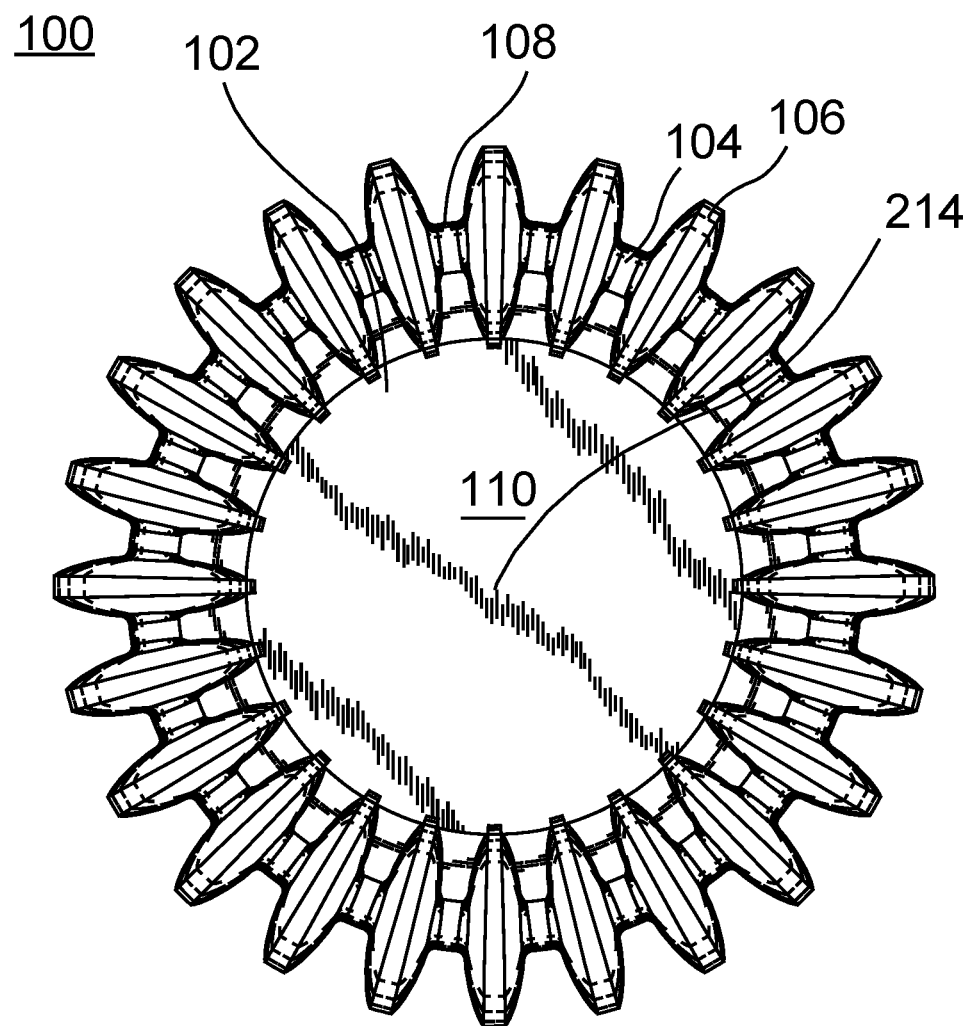

Brief Description of the Several Views of the Drawing

FIG. 1 shows a top view of a gear in accordance with an embodiment.

FIGS. 2A-2E are schematic diagrams showing an example of a shape of a gear tooth of the gear in accordance with the embodiment.

Figure 3A:
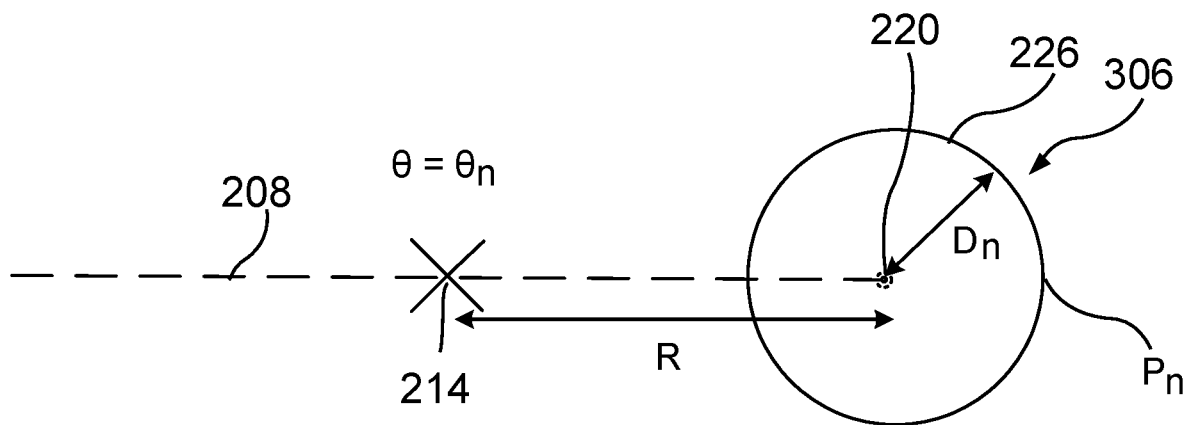
Figure 3B:
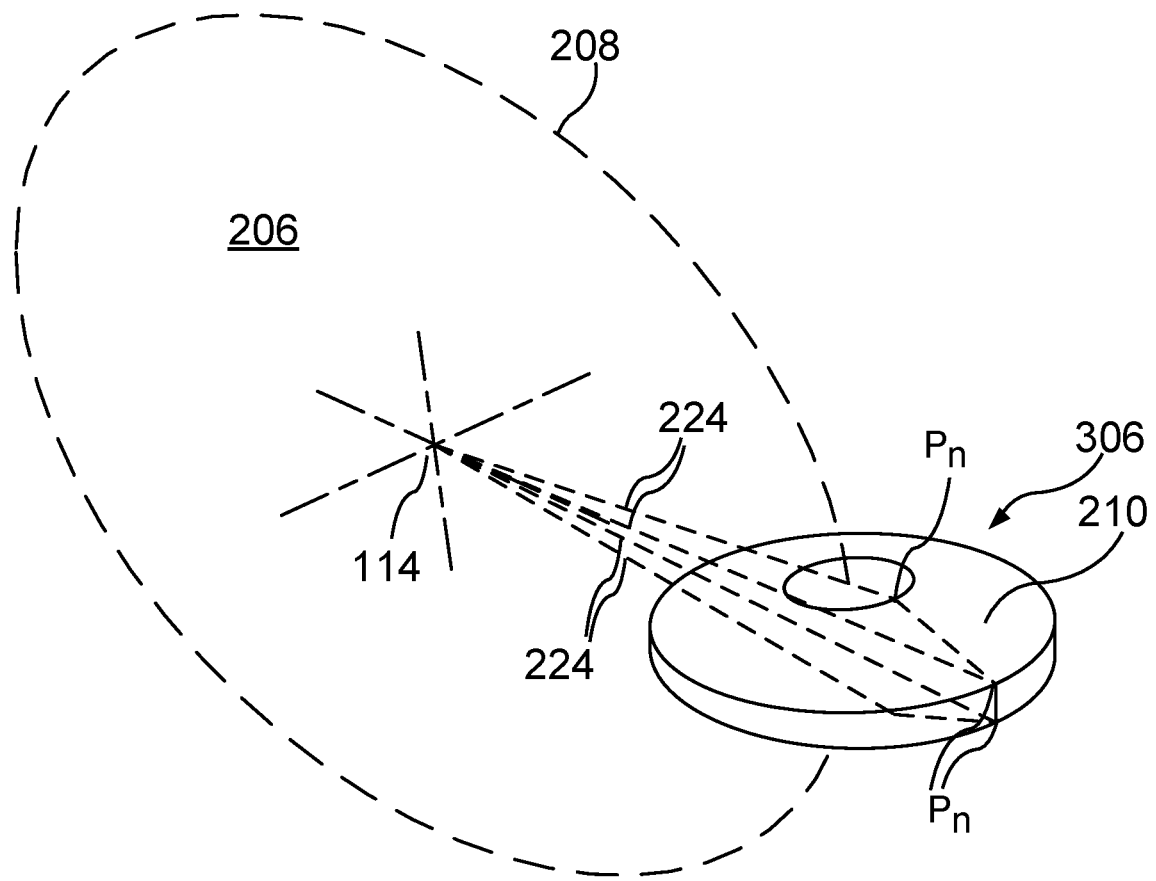

FIGS. 3A-3B are schematic diagrams showing an example of another shape of a gear tooth of the gear in accordance with another embodiment.

Figure 4:
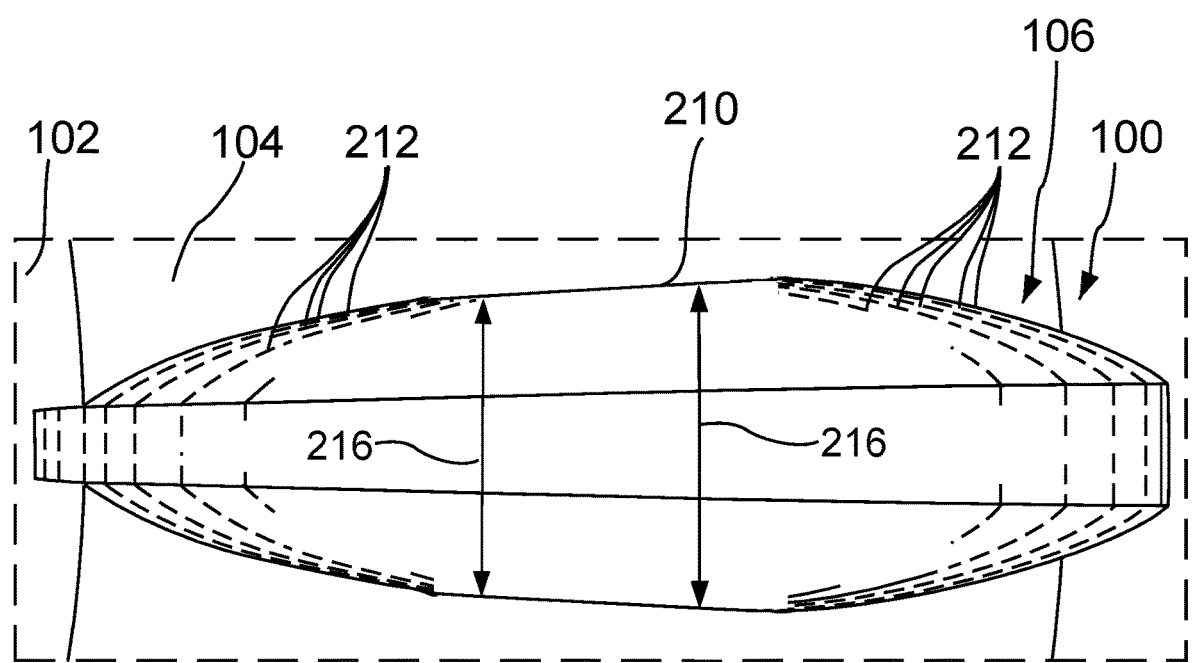

FIG. 4 shows an enlarged top view of a gear tooth of the gear shown in FIG. 1.

Figure 5A:
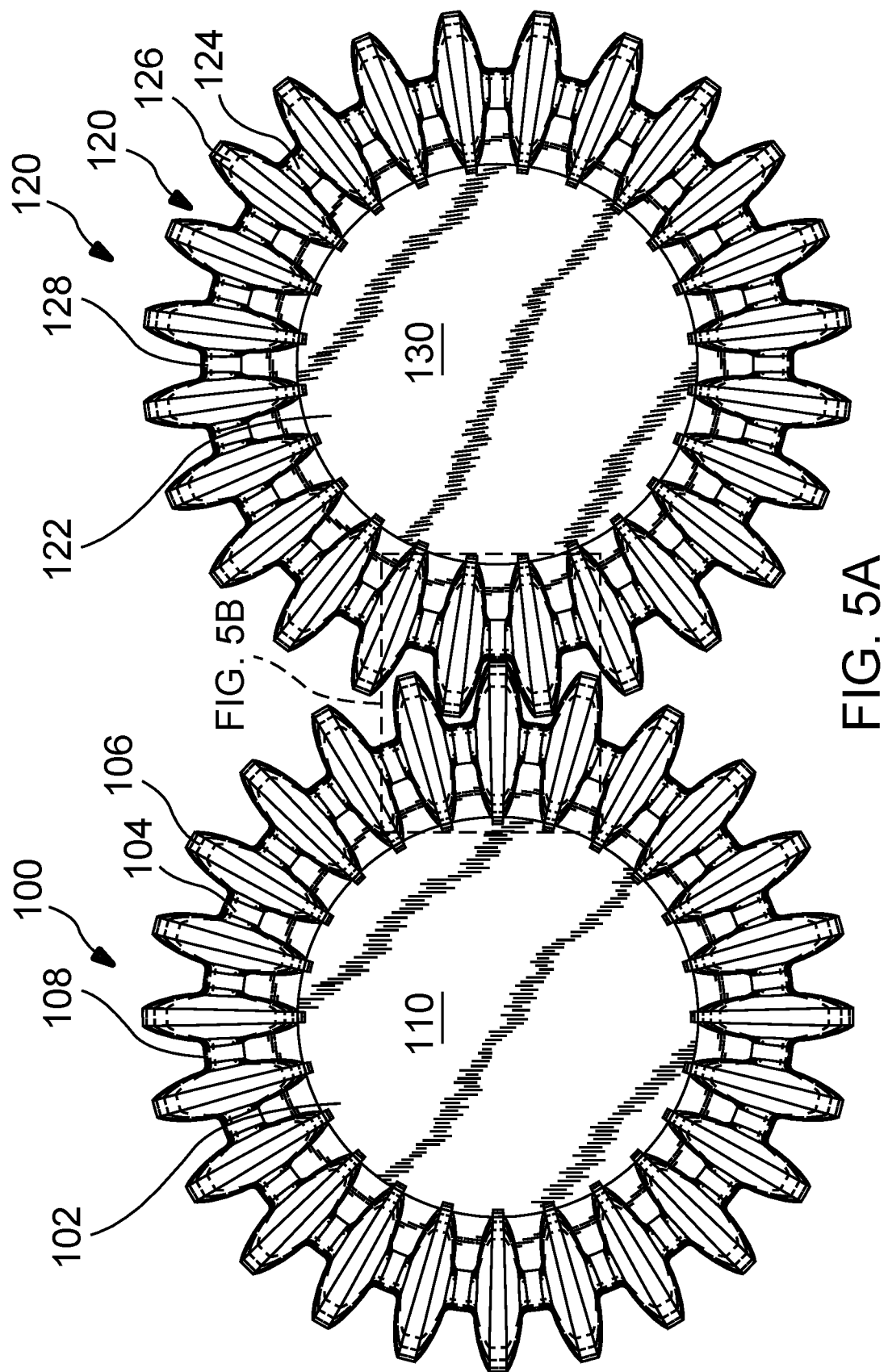
Figure 5B:
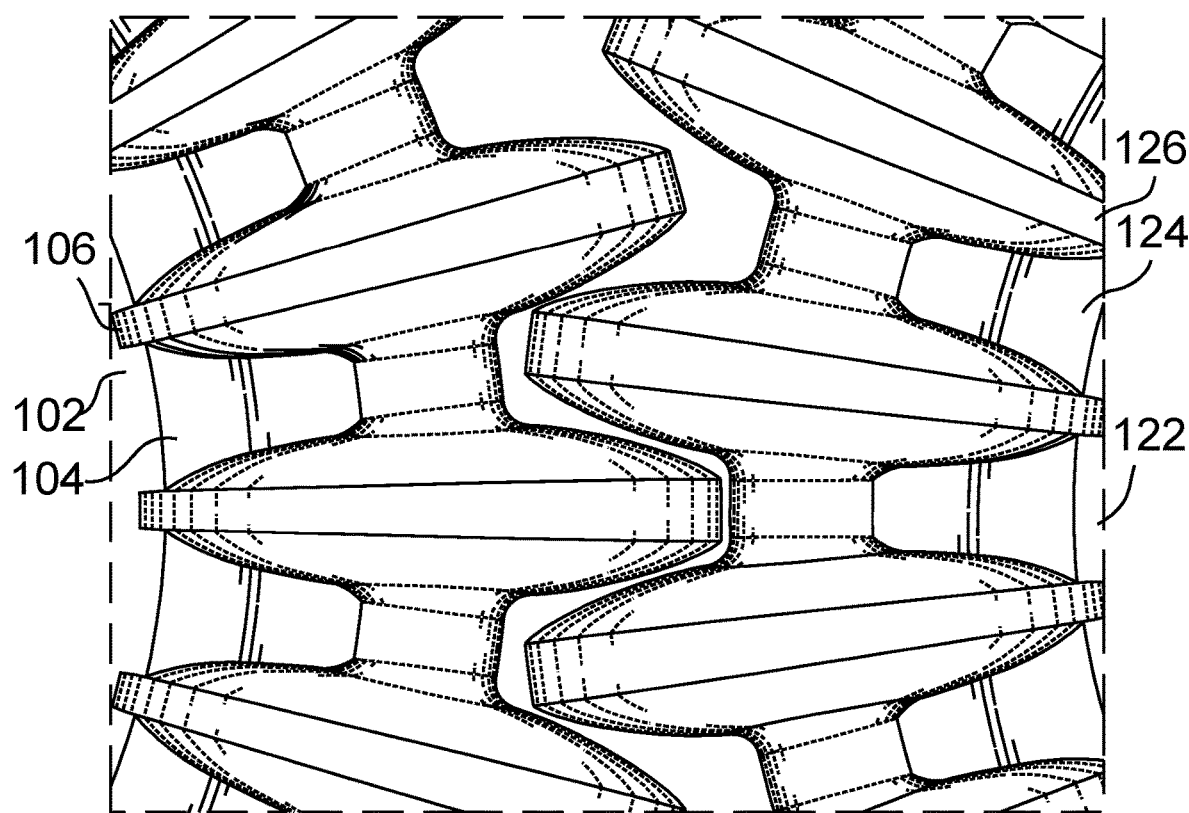

FIG. 5A shows a front view of an arrangement of a pair of gears in accordance with an embodiment; and FIG. 5B depicts an enlarged portion of the top view of the pair of the gears shown in FIG. 5A.

Figure 6A:
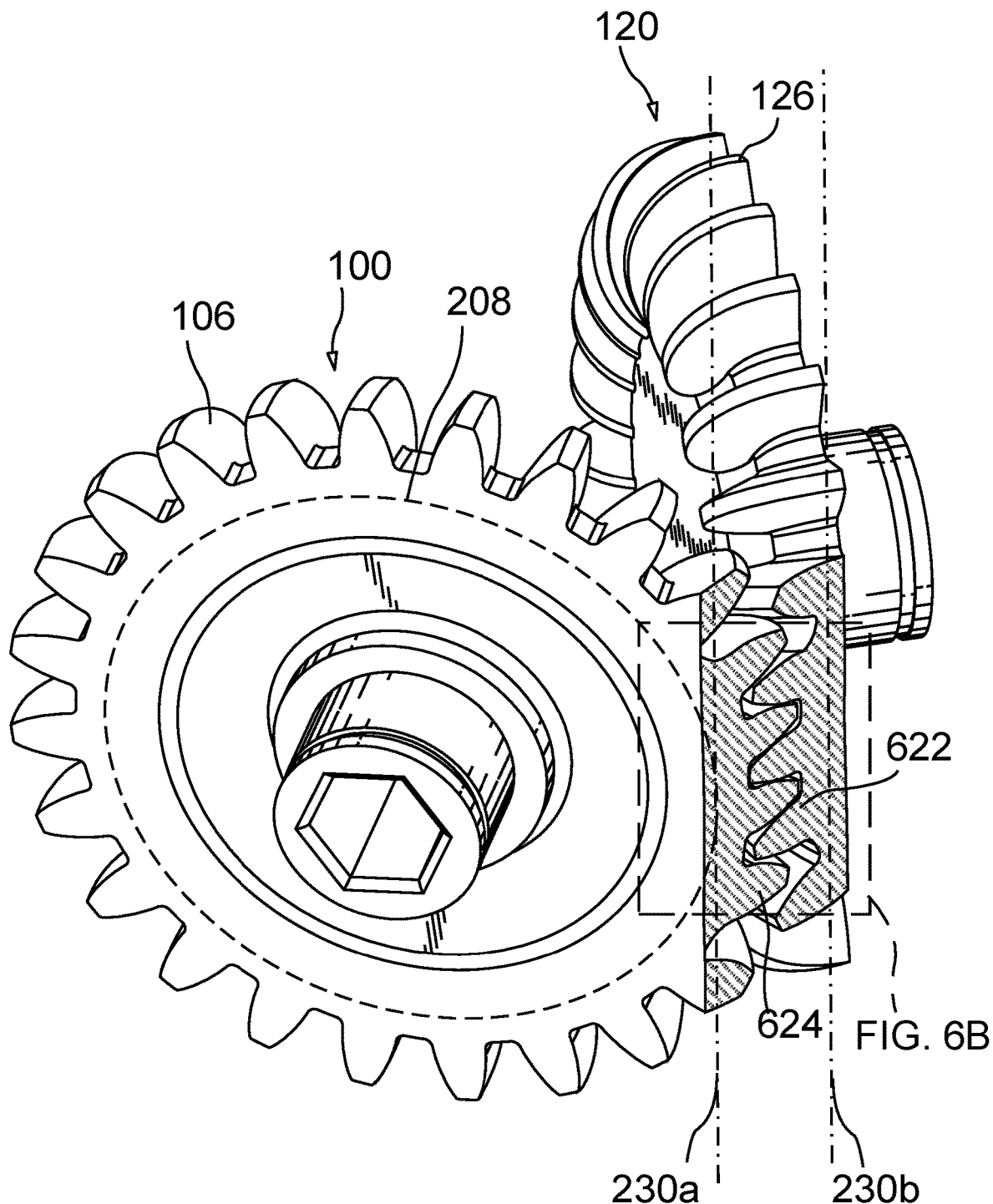
Figure 6B:
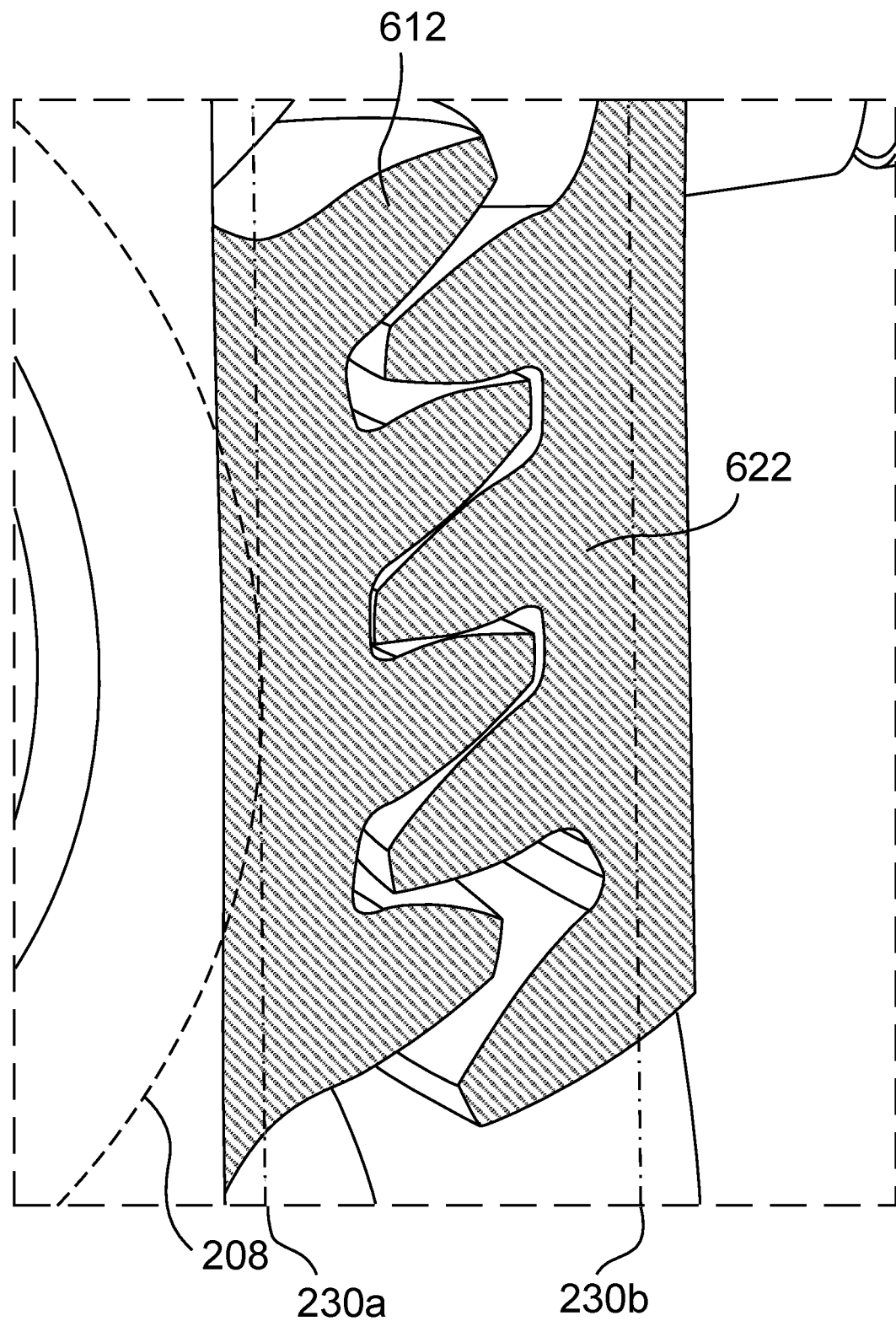

FIG. 6A depicts a side perspective view of another arrangement of the pair of gears shown in FIG. 5A and includes a cross-sectional view of a mating portion of the gears; and FIG. 6B shows a close-up view of the cross-sectional portion shown in FIG. 6A.

Figure 7:
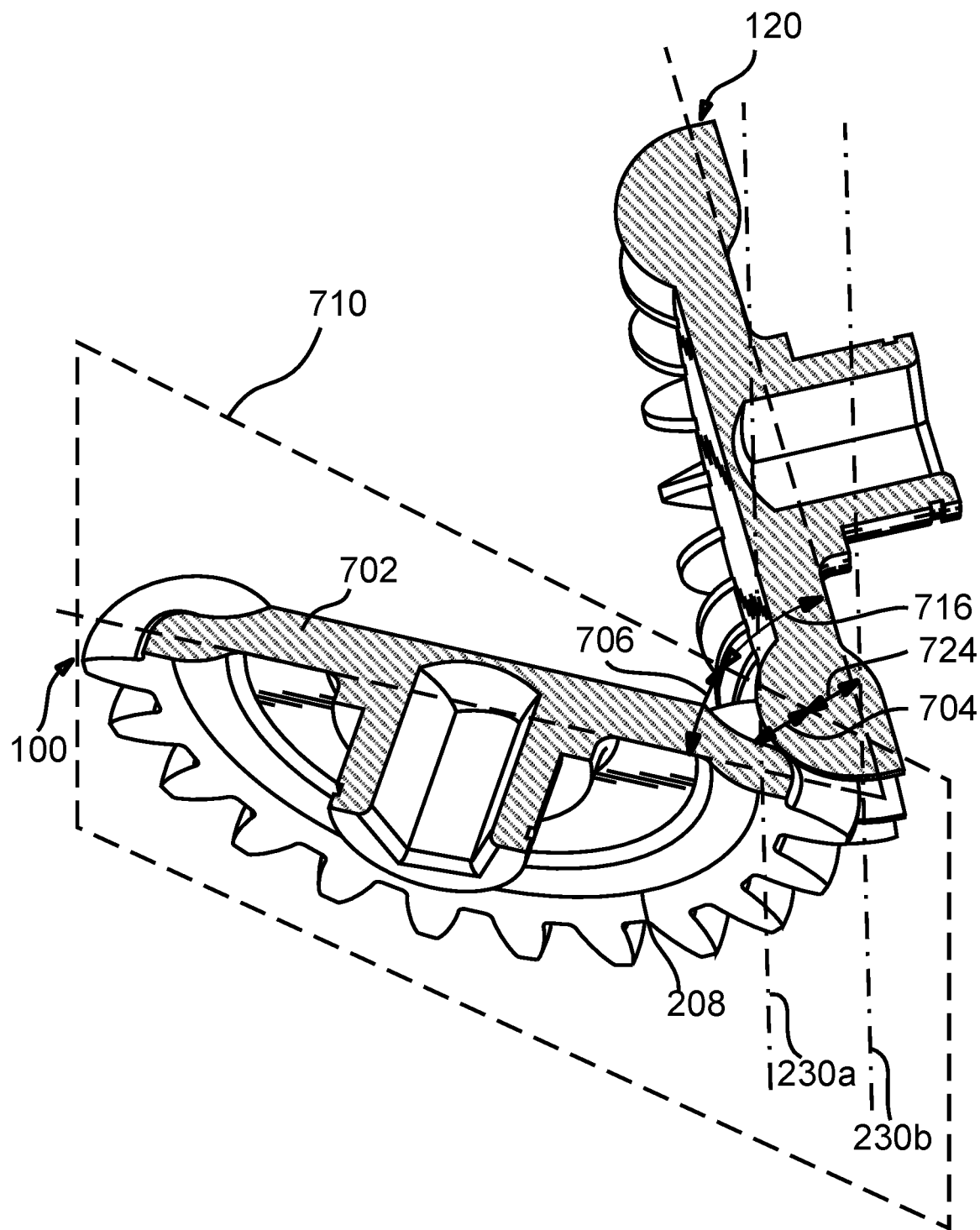

FIG. 7 depicts a perspective view of a further arrangement of the gears shown in FIG. 5A and includes a cross-sectional view of the gears.

Figure 8:
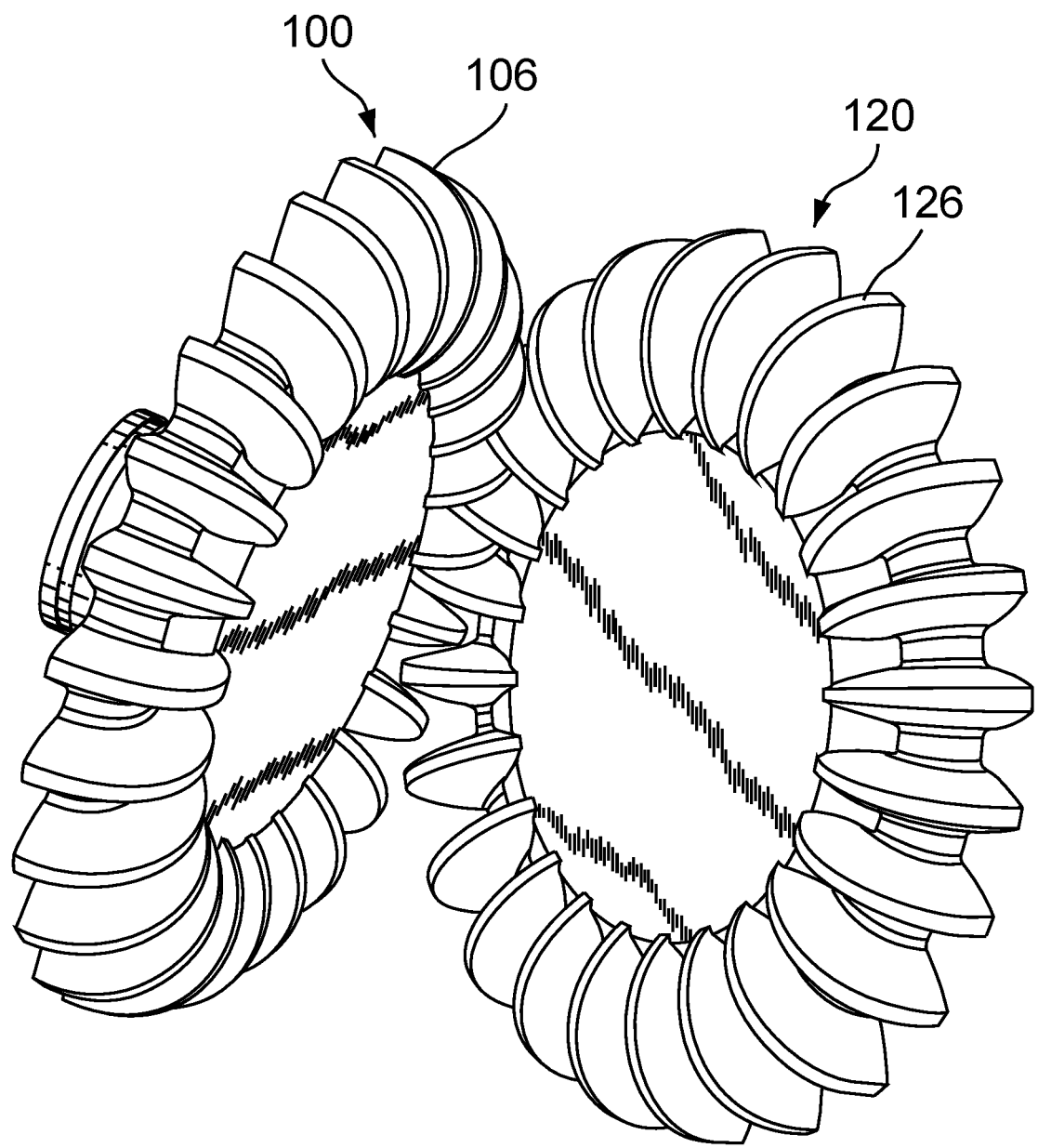

FIG. 8 shows a front perspective view of a still further arrangement of the gears shown in FIG. 5A.

Figure 9:
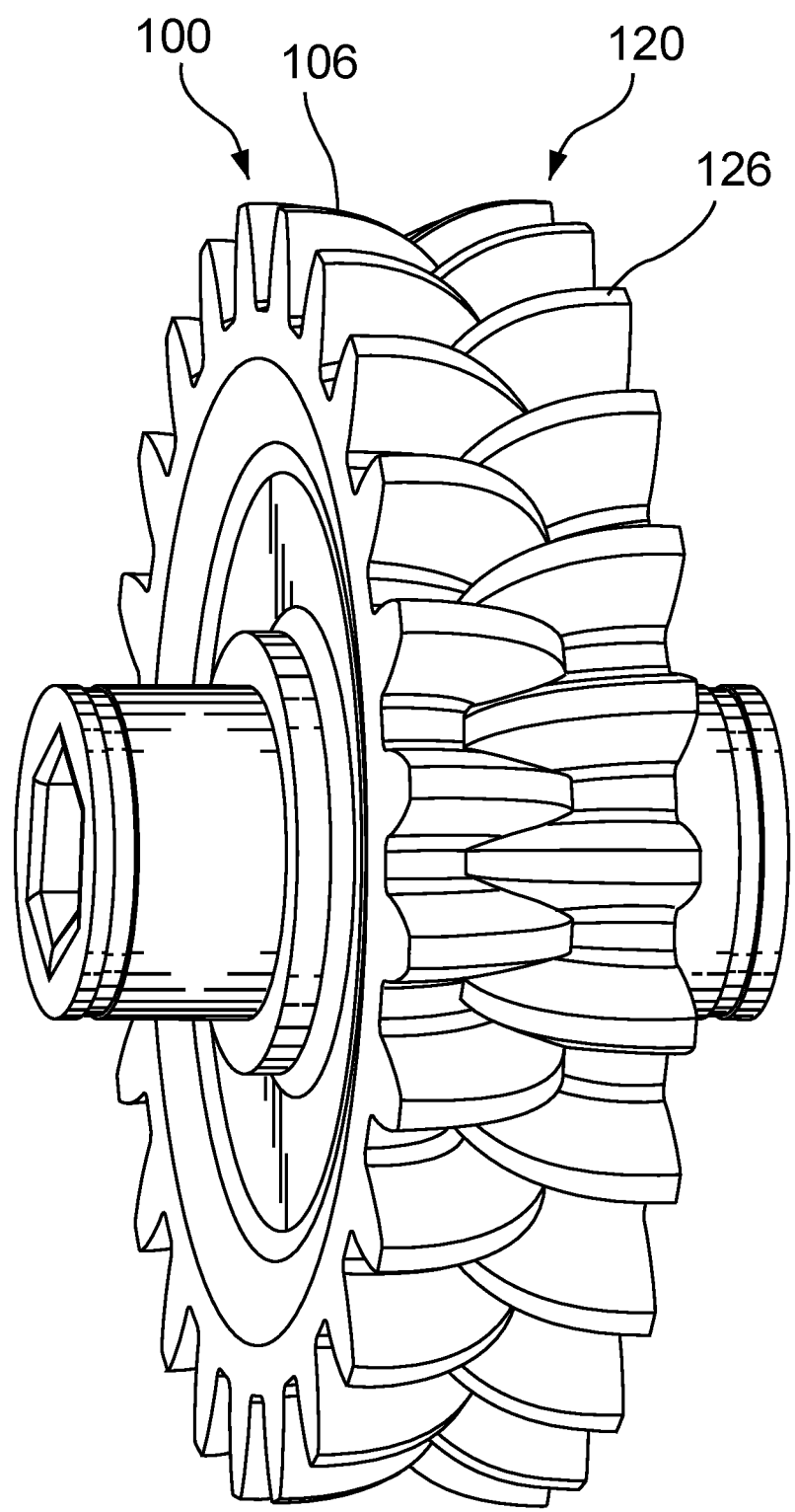

FIG. 9 shows a side perspective view of yet another arrangement of the gears shown in FIG. 5A.

Figure 10:
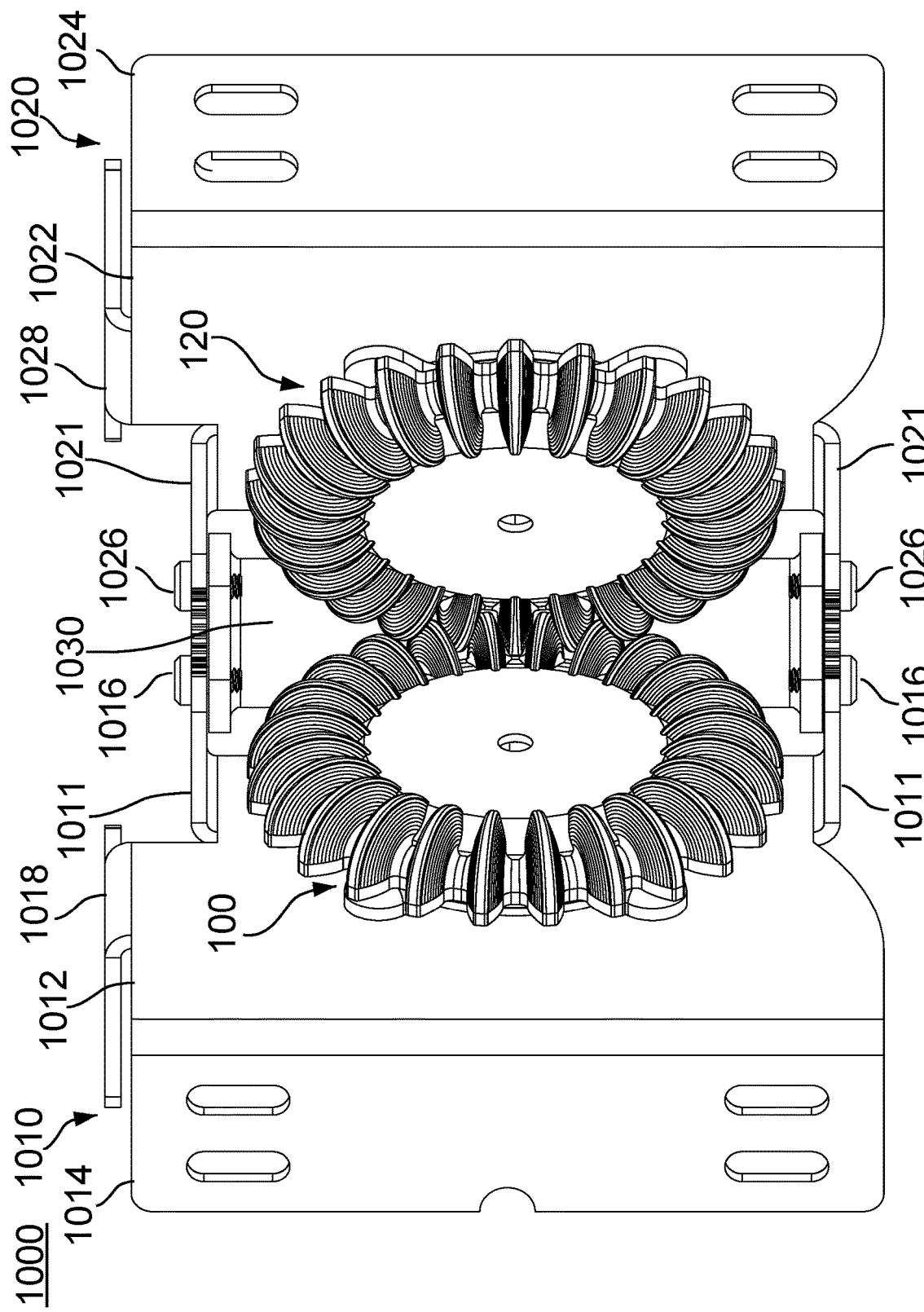

FIG. 10 depicts a front perspective view of a configuration of a mounting bracket system in accordance with an embodiment.

Figure 11:
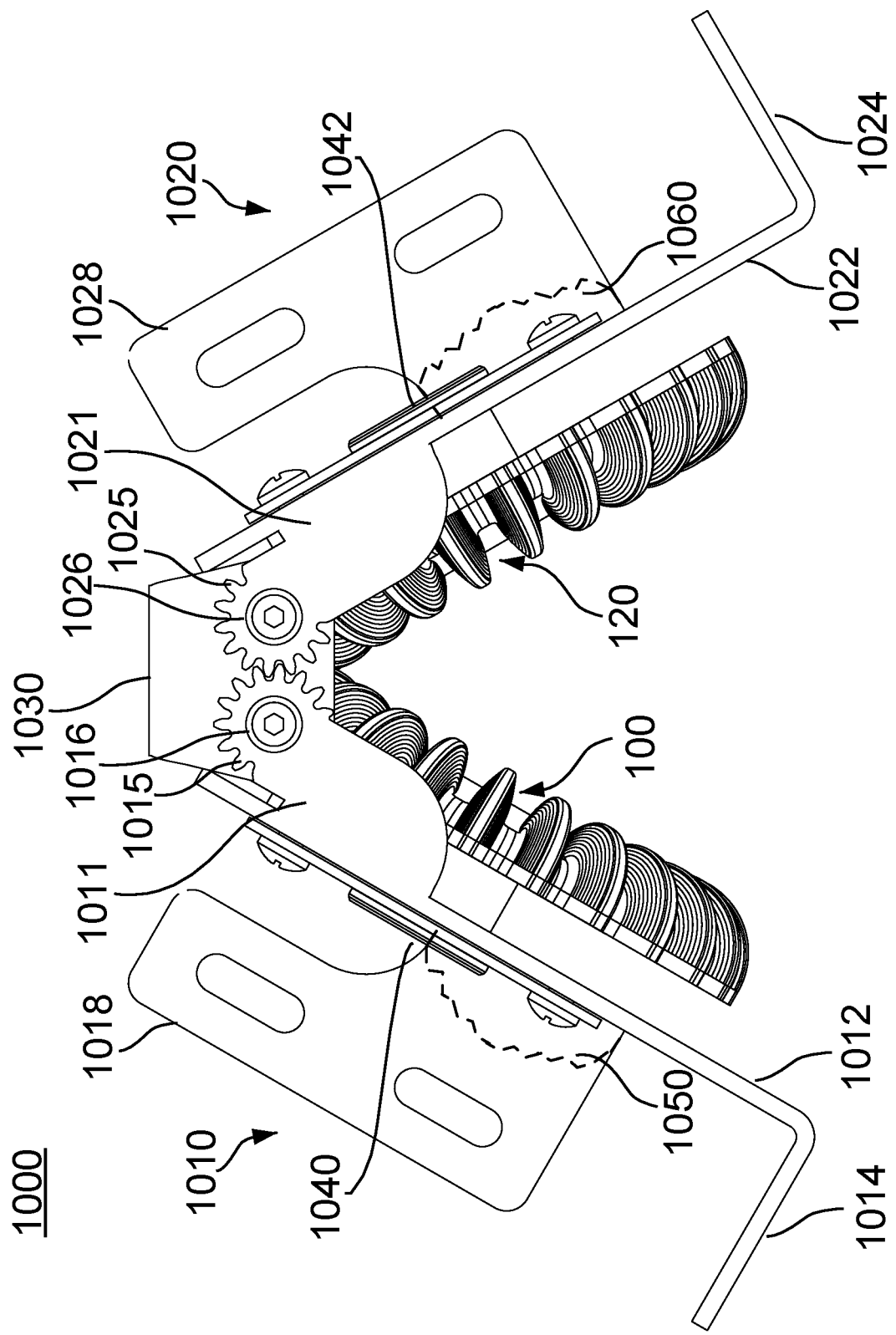

FIG. 11 shows a top perspective view of the configuration of the mounting bracket system shown in FIG. 10.

Figure 12:
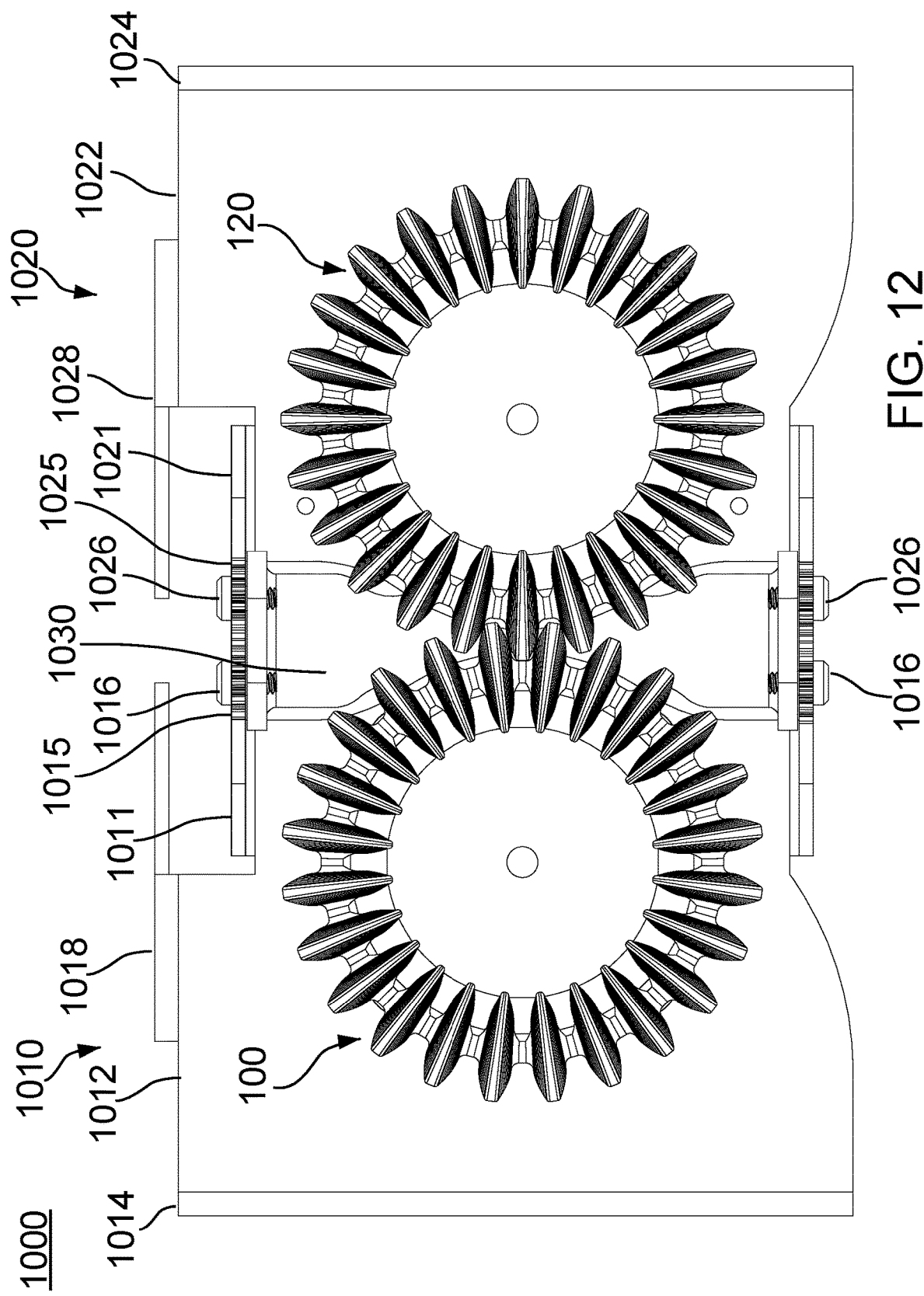

FIG. 12 depicts a front perspective view of another configuration of the mounting bracket system shown in FIG. 10.

Figure 13:
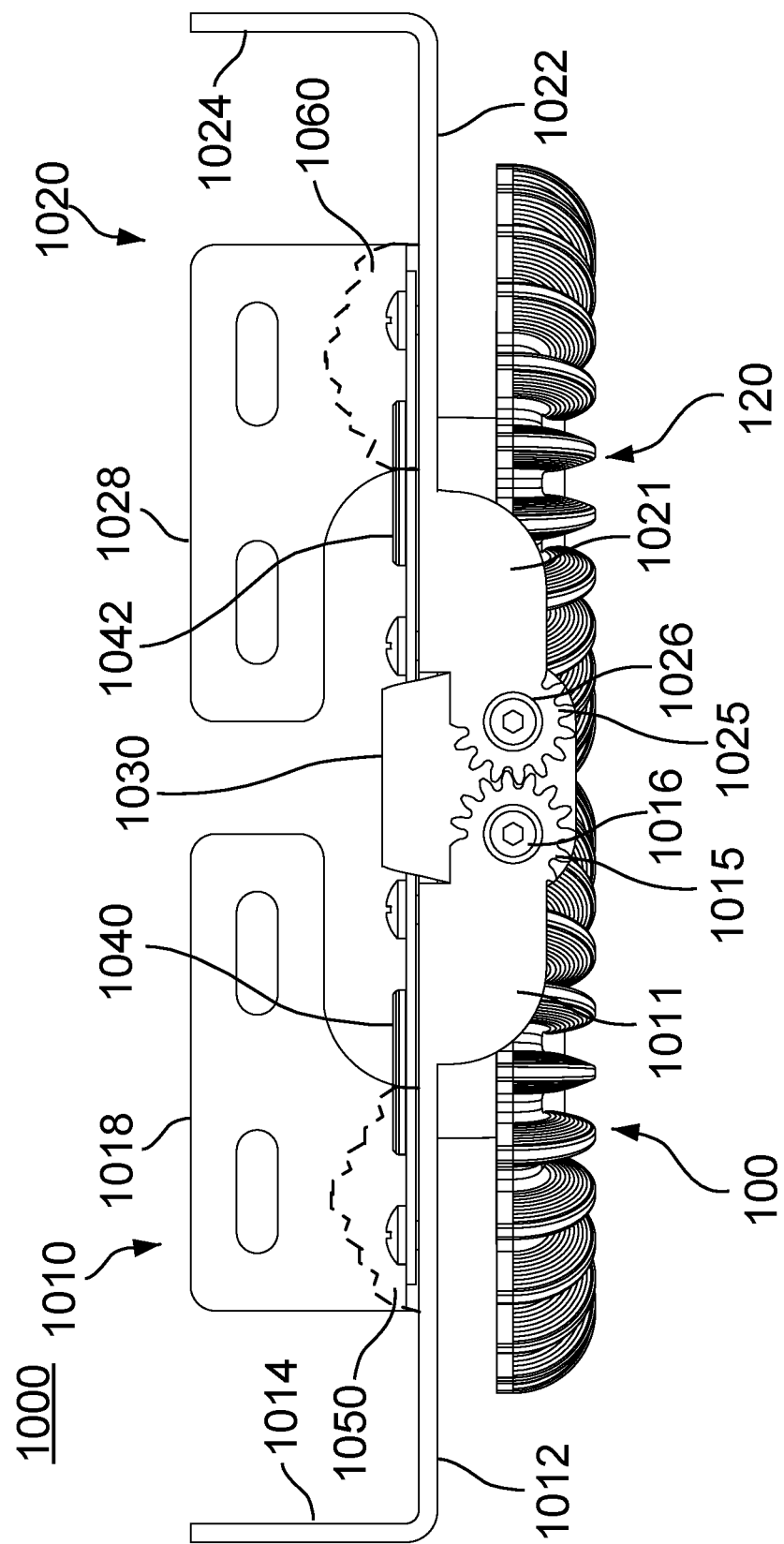

FIG. 13 shows a top perspective view of the configuration of the mounting bracket system shown in FIG. 12.

Figure 14:
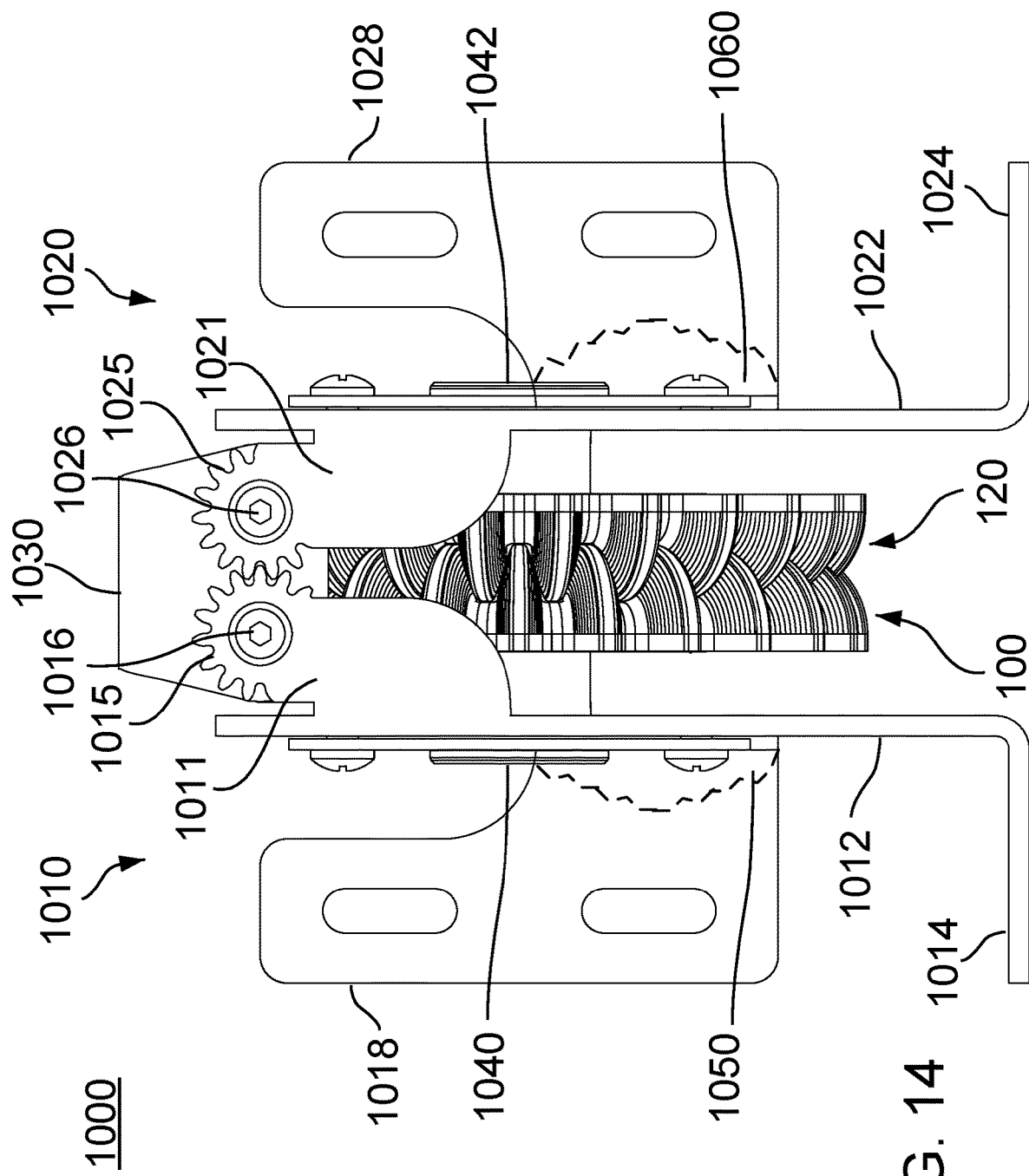

FIG. 14 shows a top perspective view of yet another configuration of the mounting bracket system shown in FIG. 10.

Figure 15:
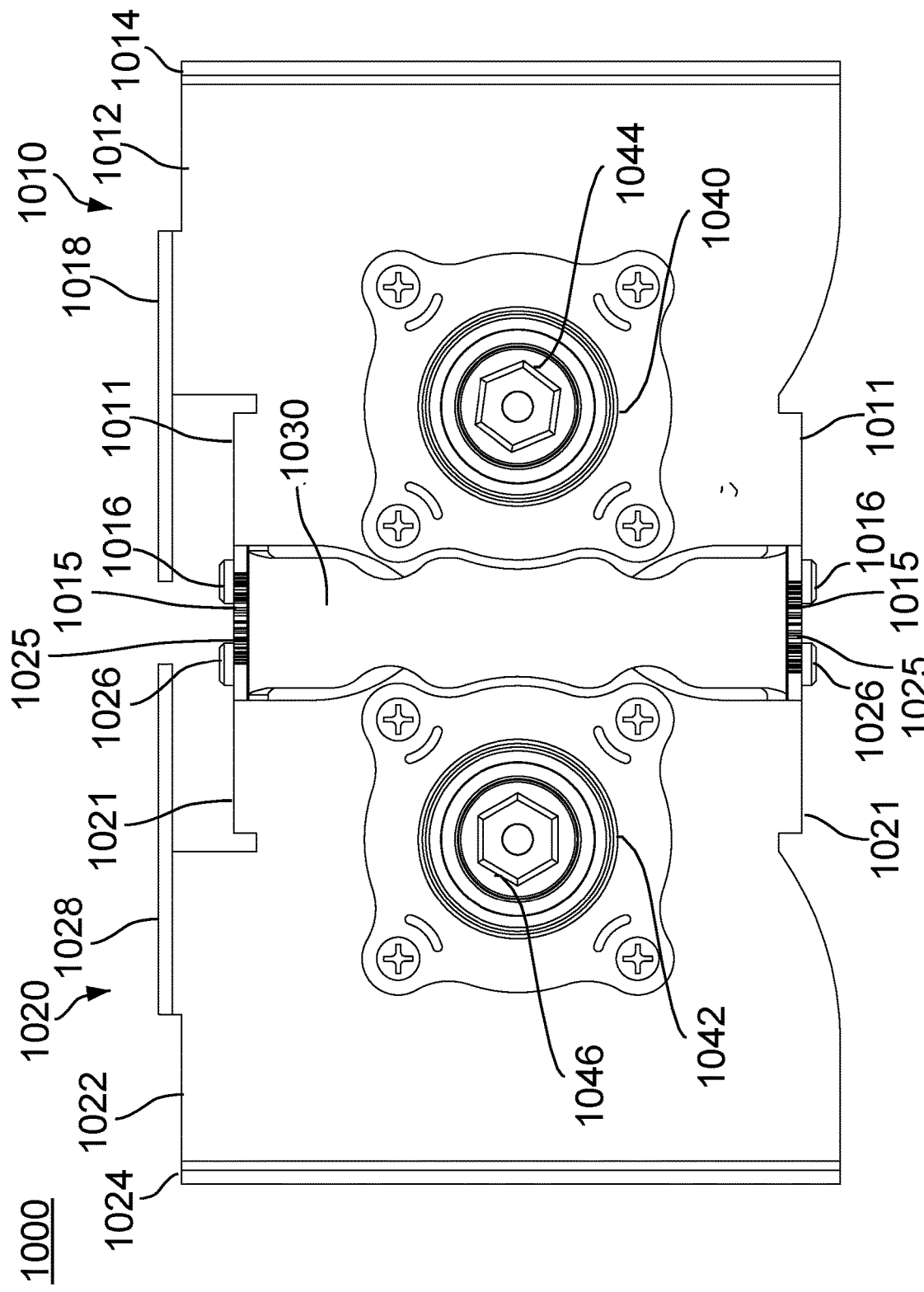

FIG. 15 depicts a back perspective view of the configuration of the mounting bracket system shown in FIG. 10.

Figure 16:
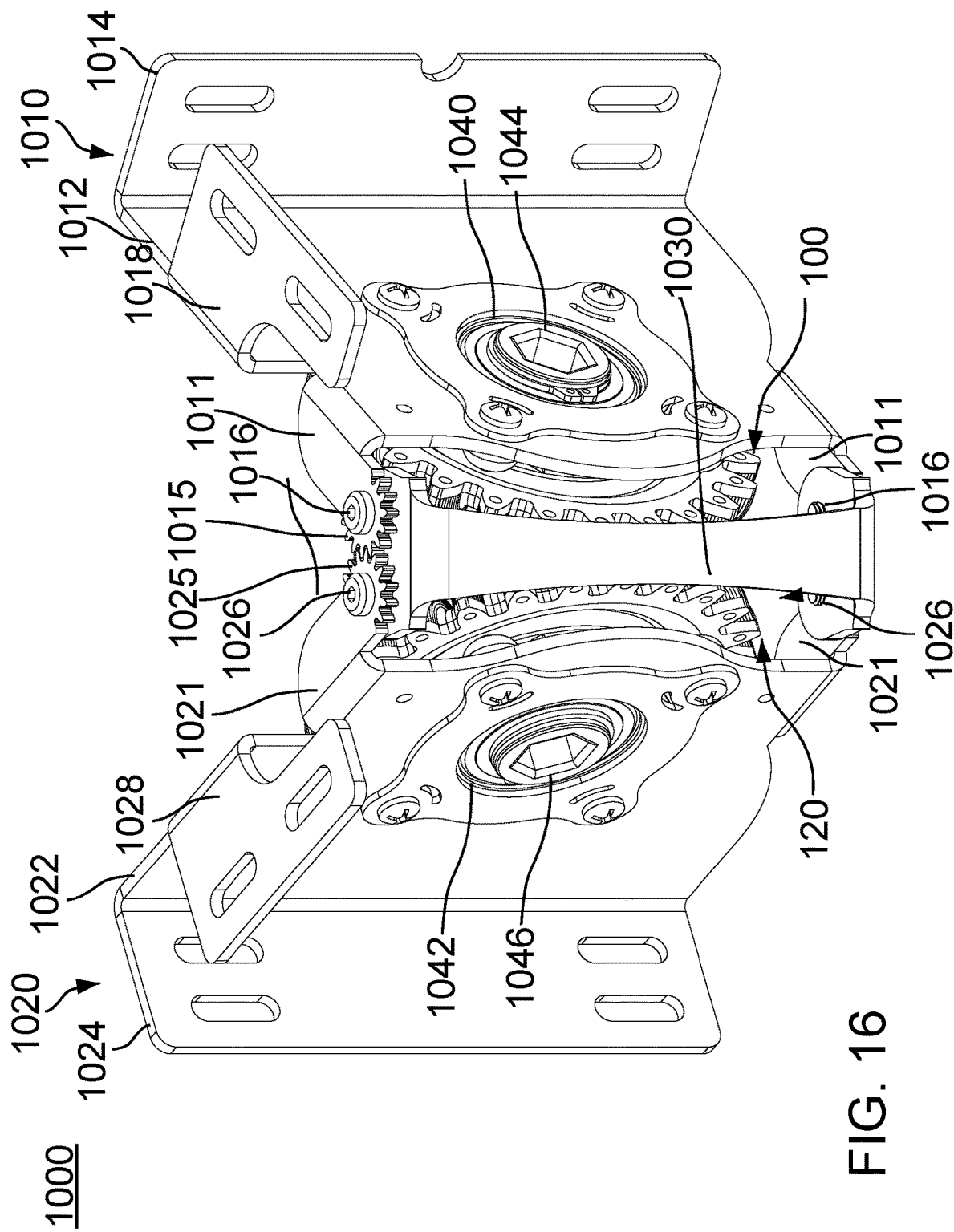

FIG. 16 depicts a back perspective view of a further configuration of the bracket system shown in FIG. 10.

Figure 17A:
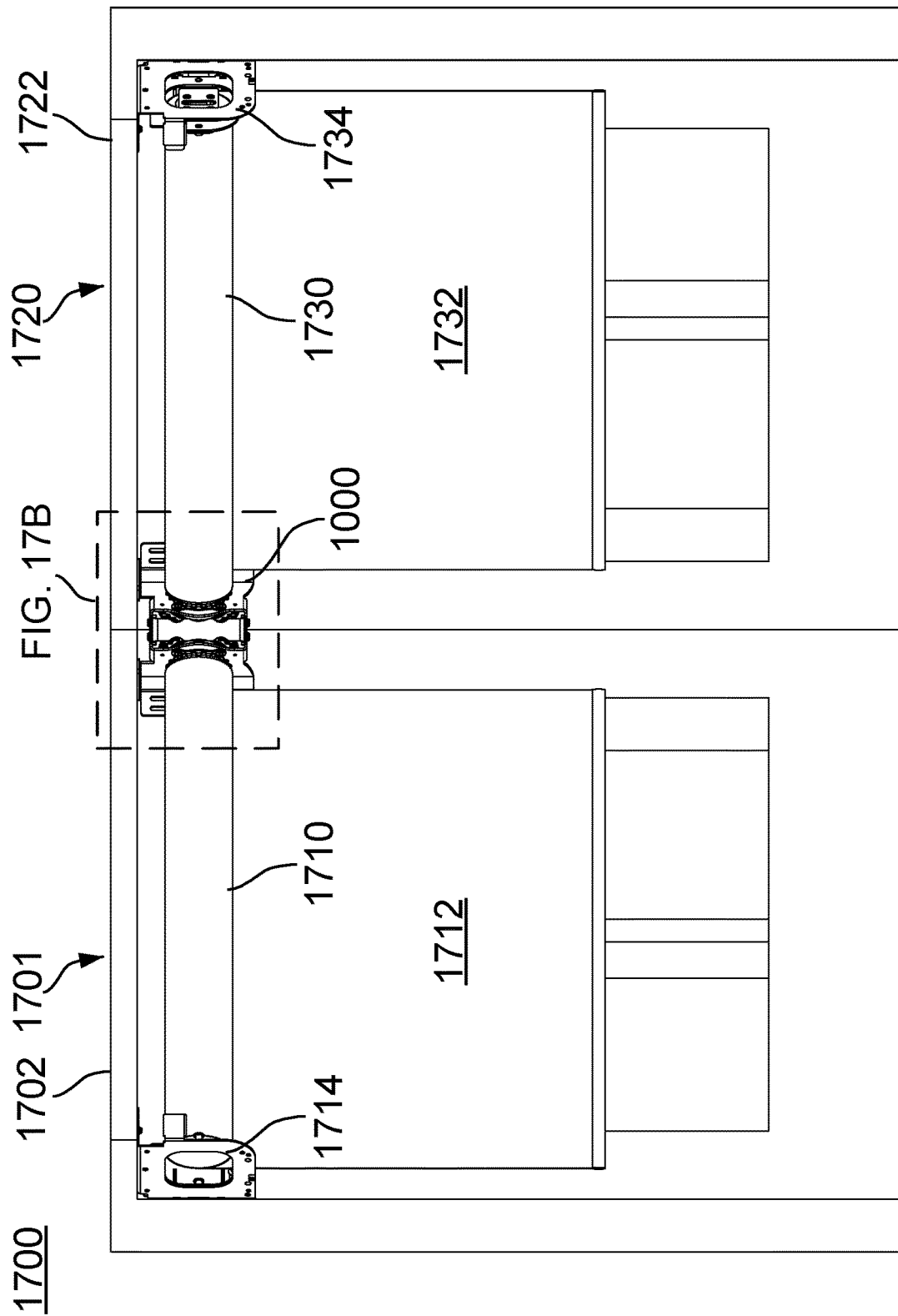
Figure 17B:
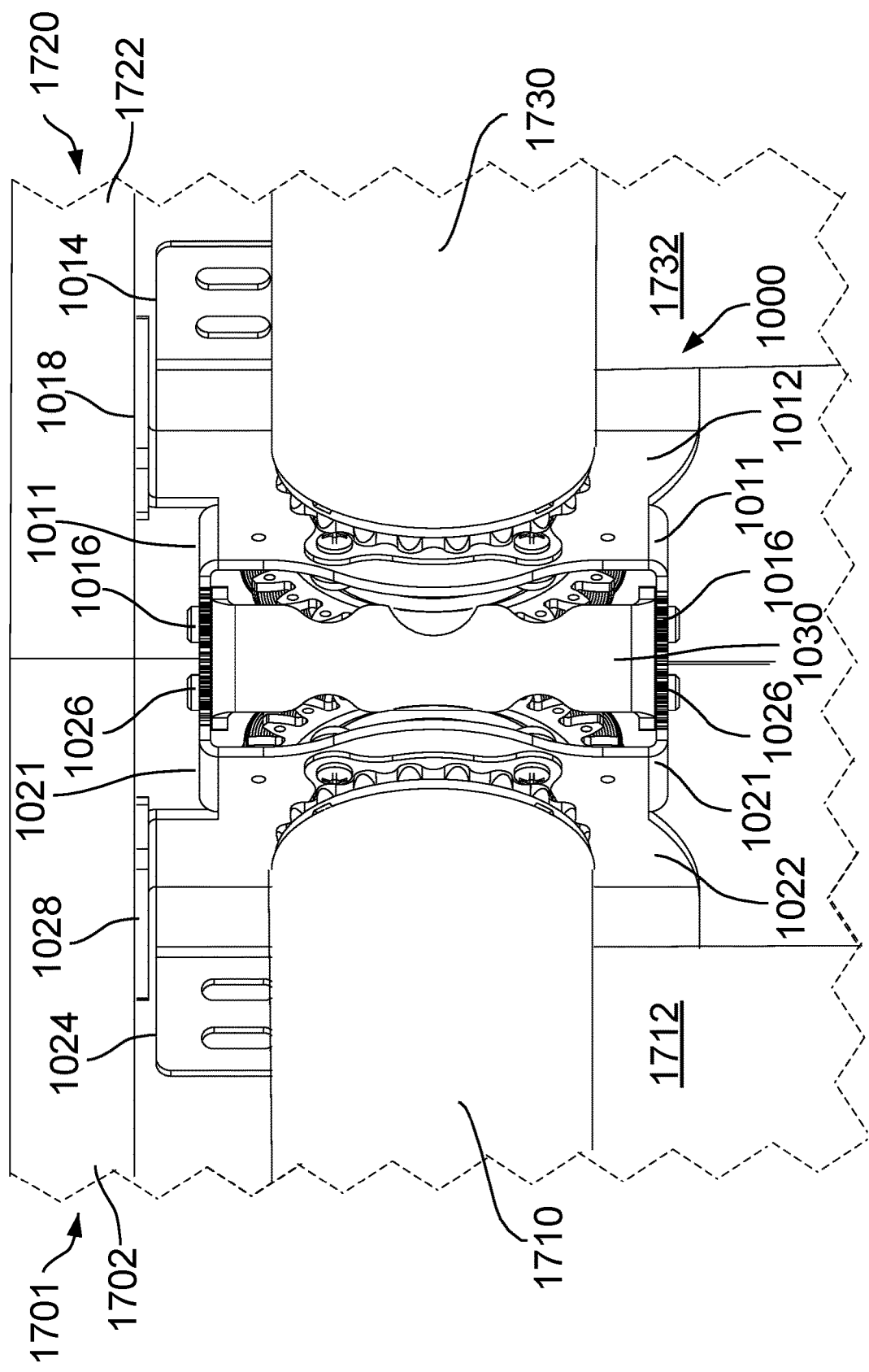

FIG. 17A shows a front perspective view of a window shade system in accordance with an embodiment, and FIG. 17B shows in greater detail the mounting bracket system part of the window shade system depicted in FIG. 17A.

Figure 18A:
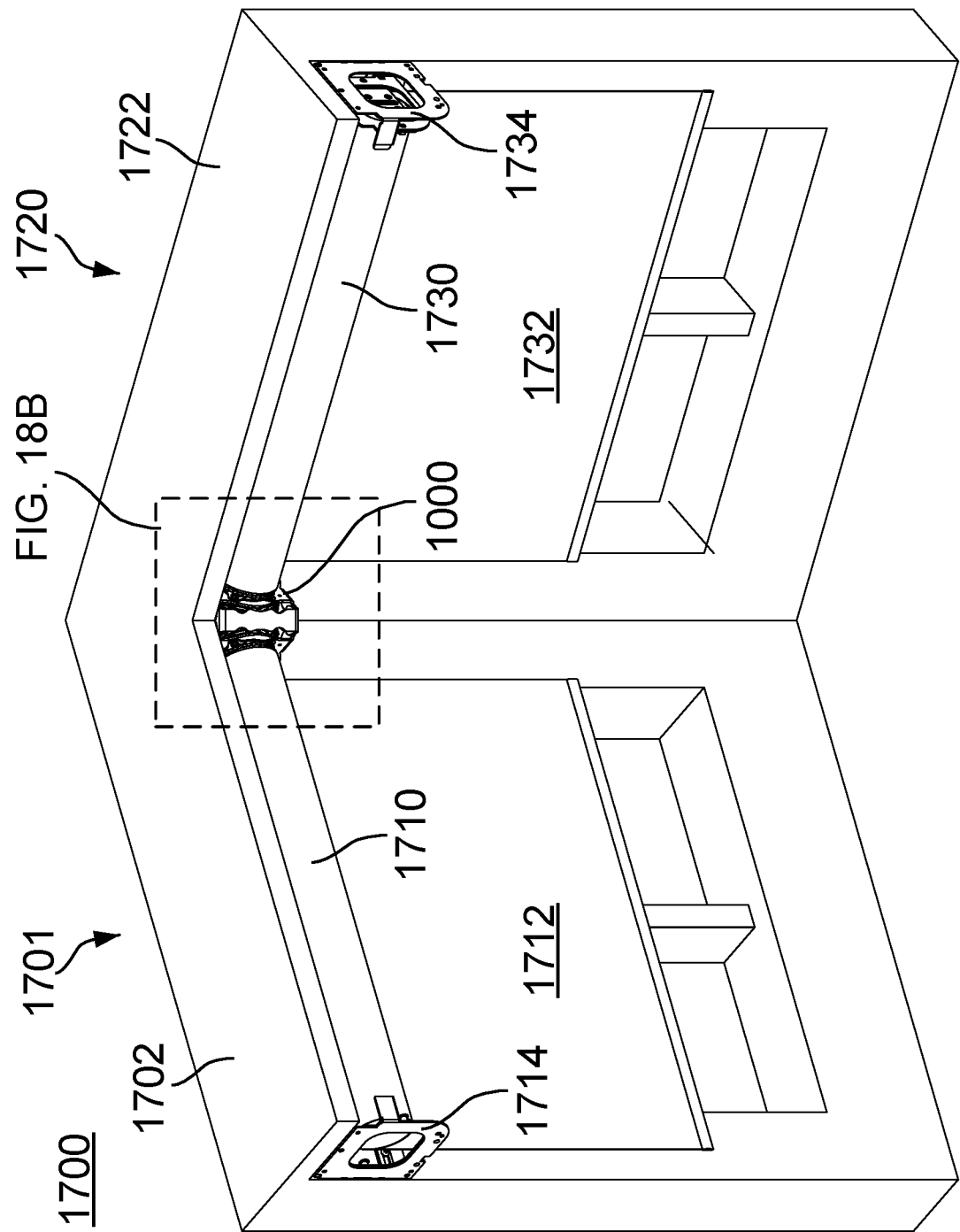
Figure 18B:
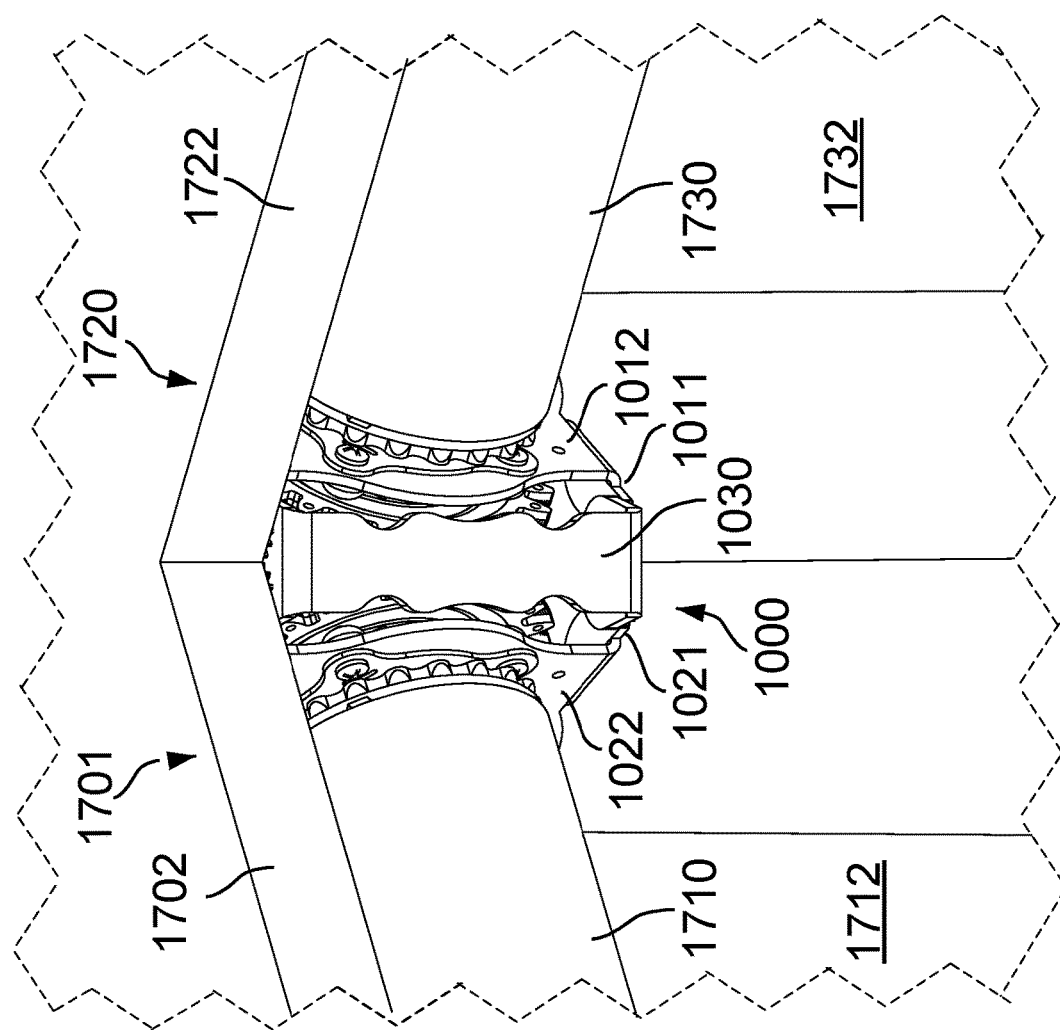

FIG. 18A shows a frontal perspective view from above of the window shade system depicted in FIG. 17A, and FIG. 18B shows in greater detail the mounting bracket system part of the window shade system depicted in FIG. 18A.

Figure 19A:
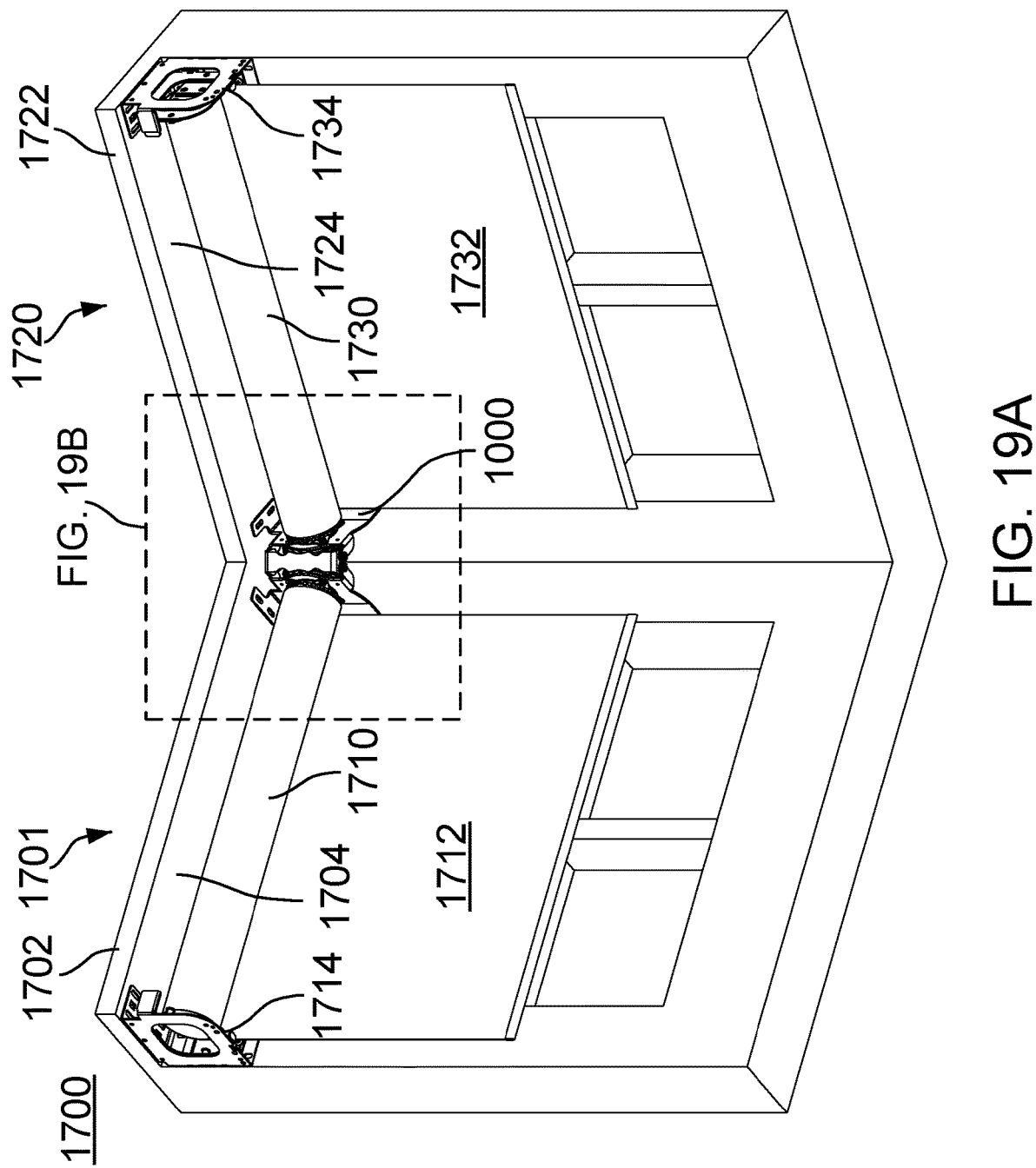
Figure 19B:
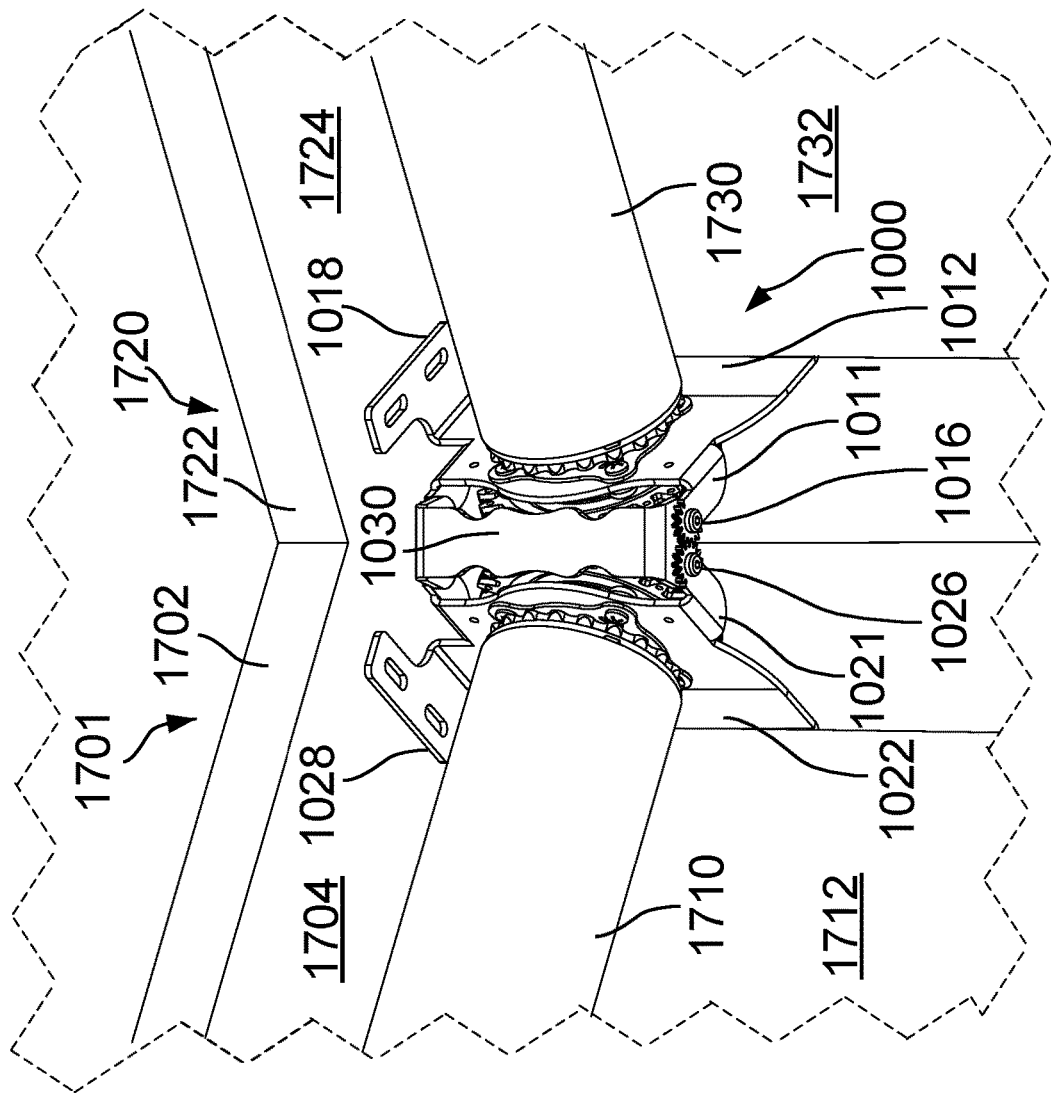

FIG. 19A shows a frontal perspective view from below of the window shade system depicted in FIG. 17A, and FIG. 19B shows in greater detail the mounting bracket system part of the window shade system depicted in FIG. 19A.

Figure 20:
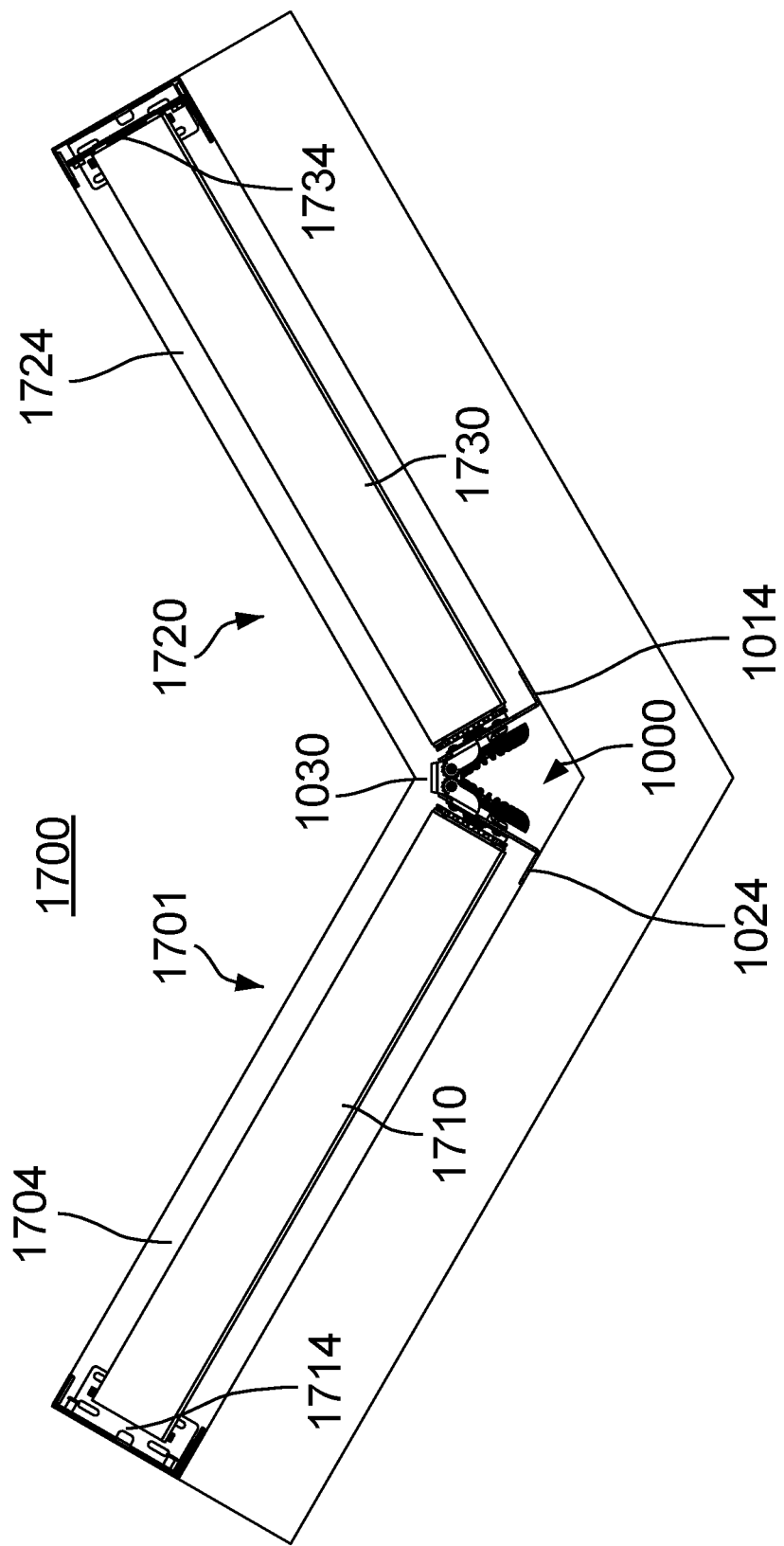

FIG. 20 shows a bottom perspective view of the window shade system depicted in FIG. 17A

DETAILED DESCRIPTION OF THE INVENTION

The present embodiments provide gears in which a pair of gears is capable of meshing at any of a range of gearing intersection angles. The shape of the gear teeth is defined by an outer profile that collapses inward with decreasing distance from the center of the gear.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

LIST OF REFERENCE NUMBERS FOR THE MAJOR ELEMENTS IN THE DRAWING

The following is a list of the major elements in the drawings in numerical order.

| | |
|---|---|
| 100 | first gear |
| 102 | inner region (of first gear 100) |
| 104 | outer region (of first gear 100) |
| 106 | gear tooth (of first gear 100) |
| 108 | circular base (of first gear 100) |
| 110 | first surface (of first gear 100) |
| 120 | second gear 120 |
| 122 | inner region (of second gear 120) |
| 124 | outer region (of second gear 120) |
| 126 | gear tooth (of second gear 120) |
| 128 | circular base (of second gear 120) |
| 130 | first surface (of second gear 120) |
| 206 | reference plane |
| 208 | reference circle |
| 210 | outer surface (of gear tooth) |
| 212 | starting profile (of gear tooth) |
| 214 | axis of gear rotation |
| 216 | width (of outer profile 212) |
| 218 | length (of outer profile 212) |
| 220 | corresponding axes of rotation of locations on starting profile |
| 222 | end portion (of starting profile 212) |
| 224 | imaginary rays (from axis of gear rotation to location on starting profile) |
| 226 | path of rotation of location on starting profile |
| 230a, 230b | pivots |
| 306 | gear tooth |
| 622 | cross-section (of gear tooth 106) |
| 624 | cross-section (of gear tooth 126) |
| 706 | first angle |
| 710 | mid-plane |
| 716 | second angle |
| 1000 | mounting bracket |
| 1010 | first plate |
| 1011 | pivoting portion (of first plate 1010) |
| 1012 | back wall (of first plate 1010) |
| 1014 | side wall (of first plate 1010) |
| 1015 | interlocking end gears (of pivoting portion 1011) |
| 1016 | first pivot element |
| 1018 | top wall (of first plate 1010) |
| 1020 | second plate |
| 1021 | pivoting portion (of second plate 1020) |
| 1022 | back wall (of second plate 1020) |
| 1024 | wall mounting portion (of second plate 1020) |
| 1025 | interlocking end gears (of pivoting portion 1021) |
| 1026 | second pivot element |
| 1028 | top wall (of second plate 1020) |
| 1030 | back plate |
| 1040 | rotation mount (of first plate 1010) |
| 1042 | rotation mount (of second plate 1020) |
| 1044 | back side opening (of first gear 100) |
| 1046 | back side opening (of second gear 120) |
| 1050 | cut-away region (of top wall 1018) |
| 1060 | cut-away region (of top wall 1028) |
| 1700 | window shade system |
| 1701 | first window frame |
| 1702 | window frame head (of first window frame 1701) |
| 1704 | inner surface (of window frame head 1710) |
| 1710 | window shade roller (of first window frame 1701) |
| 1712 | window shade (of first window frame 1700) |
| 1714 | end bracket (of first window frame 1701) |
| 1720 | second window frame |

-continued

| | |
|---|---|
| 1722 | window frame head (of second window frame 1720) |
| 1724 | inner surface (of window frame head 1722) |
| 1730 | window shade roller (of second window frame 1720) |
| 1732 | window shade (of second window frame 1720) |
| 1734 | end bracket (of second window frame 1720) |

MODE(S) FOR CARRYING OUT THE INVENTION

The embodiment described herein in the context of a gear system, but is not limited thereto, except as may be set forth expressly in the appended claims.

Referring first to FIG. 1, a first gear 100, which may be an involute gear, is depicted in accordance with an embodiment. The first gear 100 includes a circular base 108 having a first surface 110 which is divided into a central, inner region 102 and an outer region 104 which encloses the inner region 102. A plurality of gear teeth 106 are arranged at respective locations on the first gear 100. Each one of the gear teeth extends upwardly, in part, and outwardly, in part, primarily from the outer region 104 of the first surface.

Figure 2A:
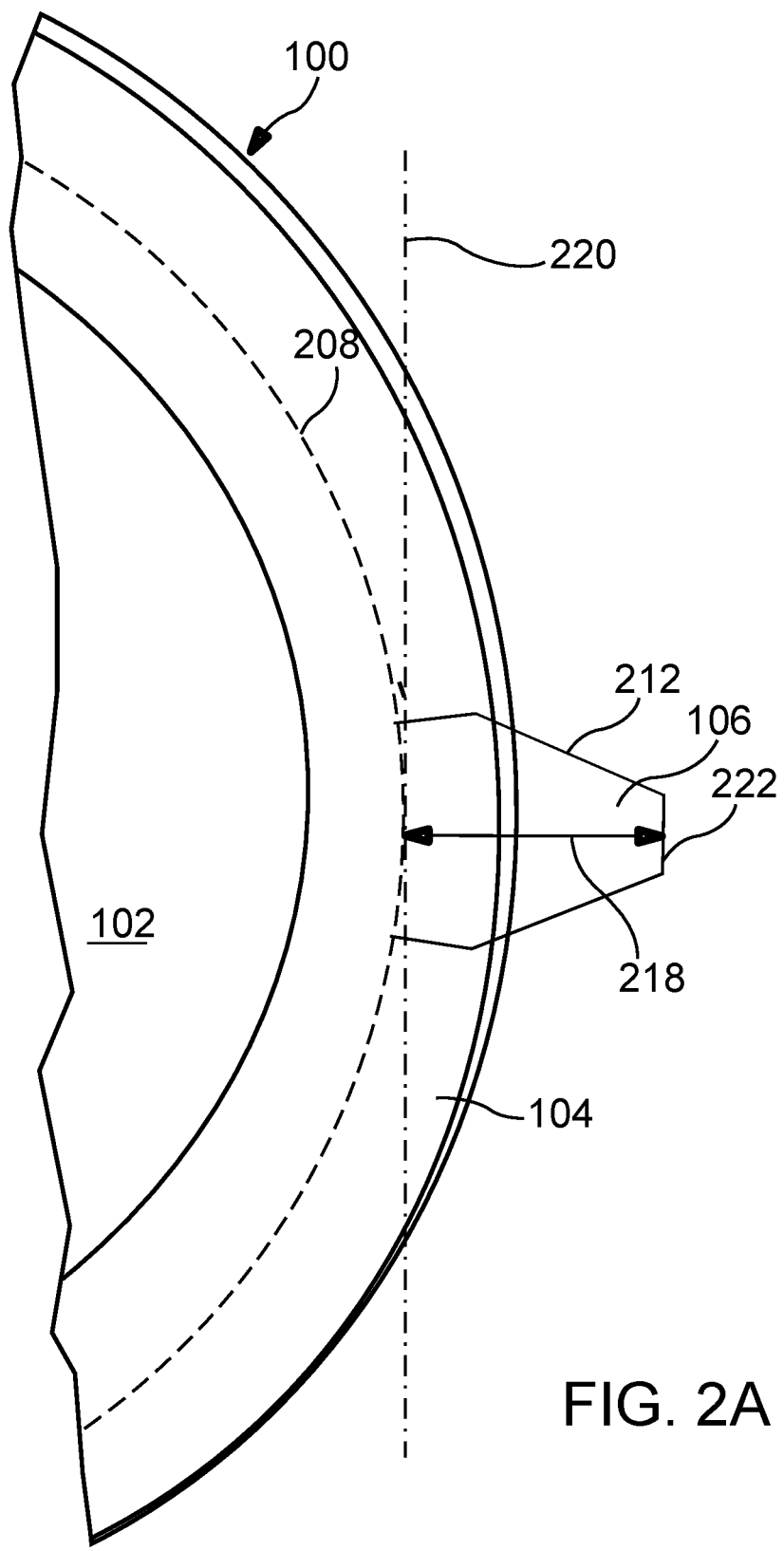

FIGS. 2A-2E illustrate the manner in which the shape of a gear tooth 106 is defined for the gear 100 in accordance with an embodiment. FIG. 2A shows a top view of a cut-away portion of the inner region 102 and the outer region 104 of the gear 100. The gear 100 is configured to rotate about an axis of gear rotation 214. A reference plane 206 (shown in FIG. 2B) is defined perpendicular to the axis of gear rotation 214 and has a radius R. An imaginary reference circle 208 is defined in the reference plane 206. The imaginary reference circle is concentric with the axis of gear rotation 214 of the gear 100 and encloses the inner region 102.

Each gear tooth 106 of the gear 100 is disposed along the imaginary reference circle 208. The outer shape of the gear tooth 106 may be defined from a starting profile 212 which is in the reference plane 206 and extending outward from the reference circle 208.

For each location $P_n$ on the starting profile 212, a corresponding imaginary ray 224 may be drawn from the axis of gear rotation 214 of the gear to that location on the starting outer profile 212. The coordinates of each location Pn on the starting profile 212 may be defined using a cylindrical coordinate system (r, θ, z) having its origin located at the axis of gear rotation 214, in which r is a distance from the axis of gear rotation 214 in the reference plane 206, θ is an angle defined in the reference plane 206, and z is a distance above or below the reference plane 206. Thus, each location $P_n$ on the starting profile 212 has a corresponding set of coordinates $(r_n, θ_n, z=0)$.

Figure 2B:
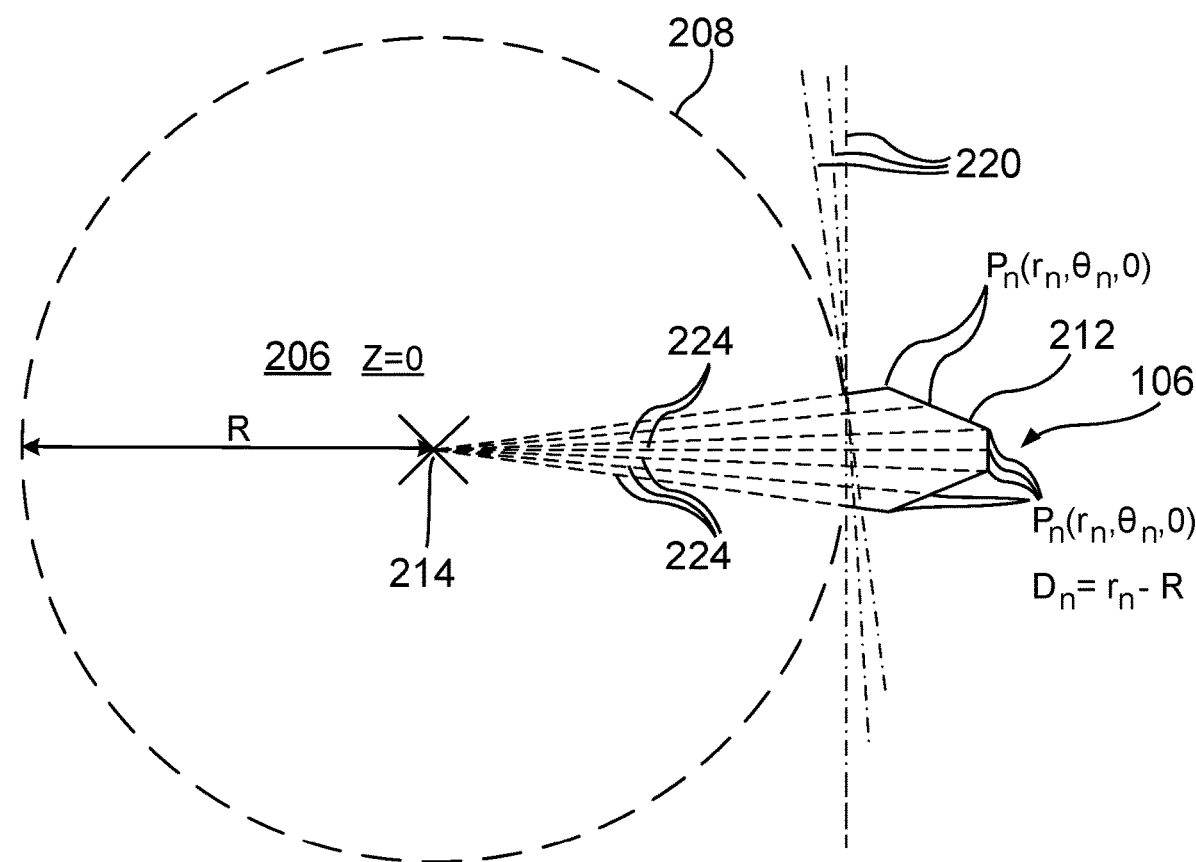

FIG. 2B shows examples of the imaginary rays 224. Also, for each location $P_n$ on the starting profile 212, a corresponding further axis 220 is shown which is tangential to the imaginary reference circle 208 and is located at the intersection of the reference circle 208 and the corresponding imaginary ray 224. Using the above cylindrical coordinate system, this intersection has the coordinates (R, $θ_n$, 0) so that each location $P_n$ on the starting profile 212 is located at a distance $D_n=r_n-R$ from the corresponding further axis 220.

Figure 2C:
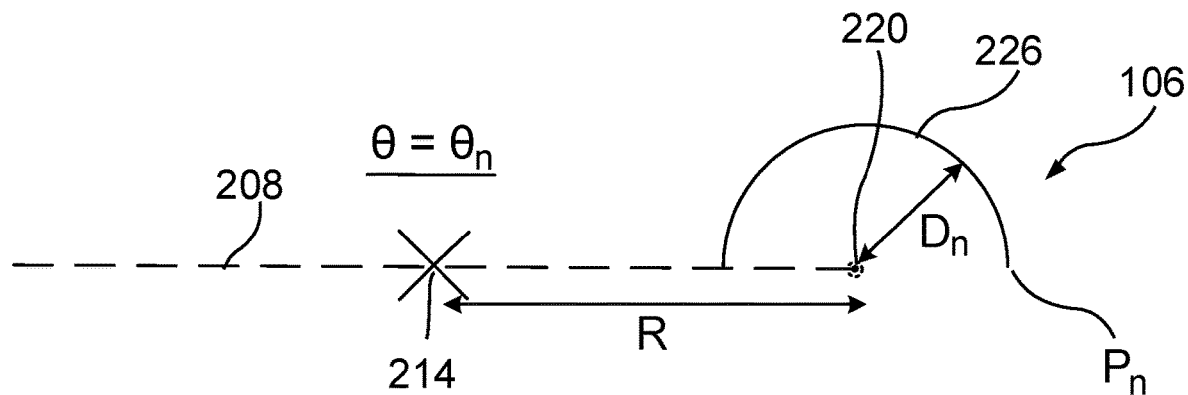

To define the outer profile of the gear tooth 106, each location $P_n$ on the starting profile 212 is rotated about its corresponding axis 220 out of the reference plane 206 while remaining at the distance $D_n$ from its corresponding axis 220. That is, as FIG. 2C shows, the rotation of each location $P_n$ on the starting profile 212 about its corresponding axis 220 defines a corresponding circular path 226 having a radius $D_n$. Though a rotation of 180° about the axis 220 is shown, the angle of rotation may be any value greater or less than 180°. For example, a rotation of 90° about the corresponding axis 220 is sufficient to allow for a 180° range of gearing angles.

Figure 2D:
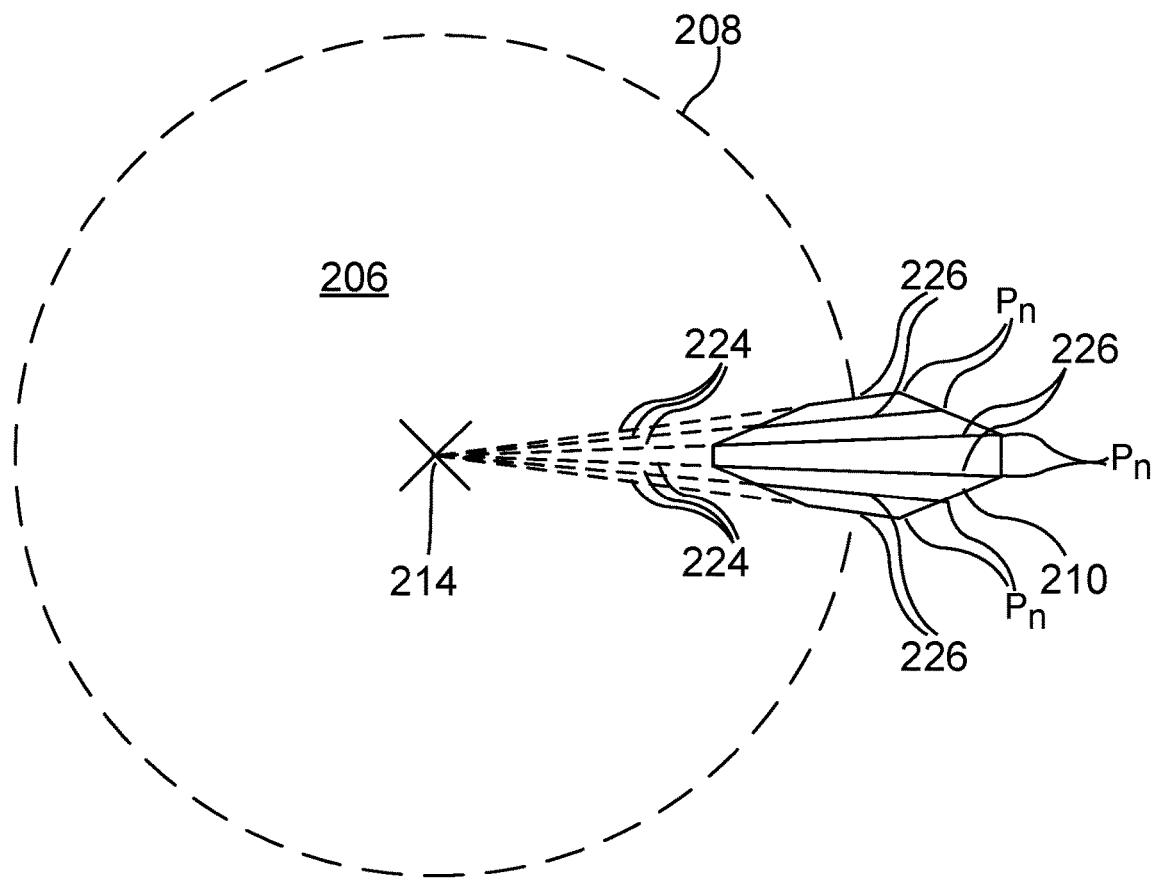
Figure 2E:
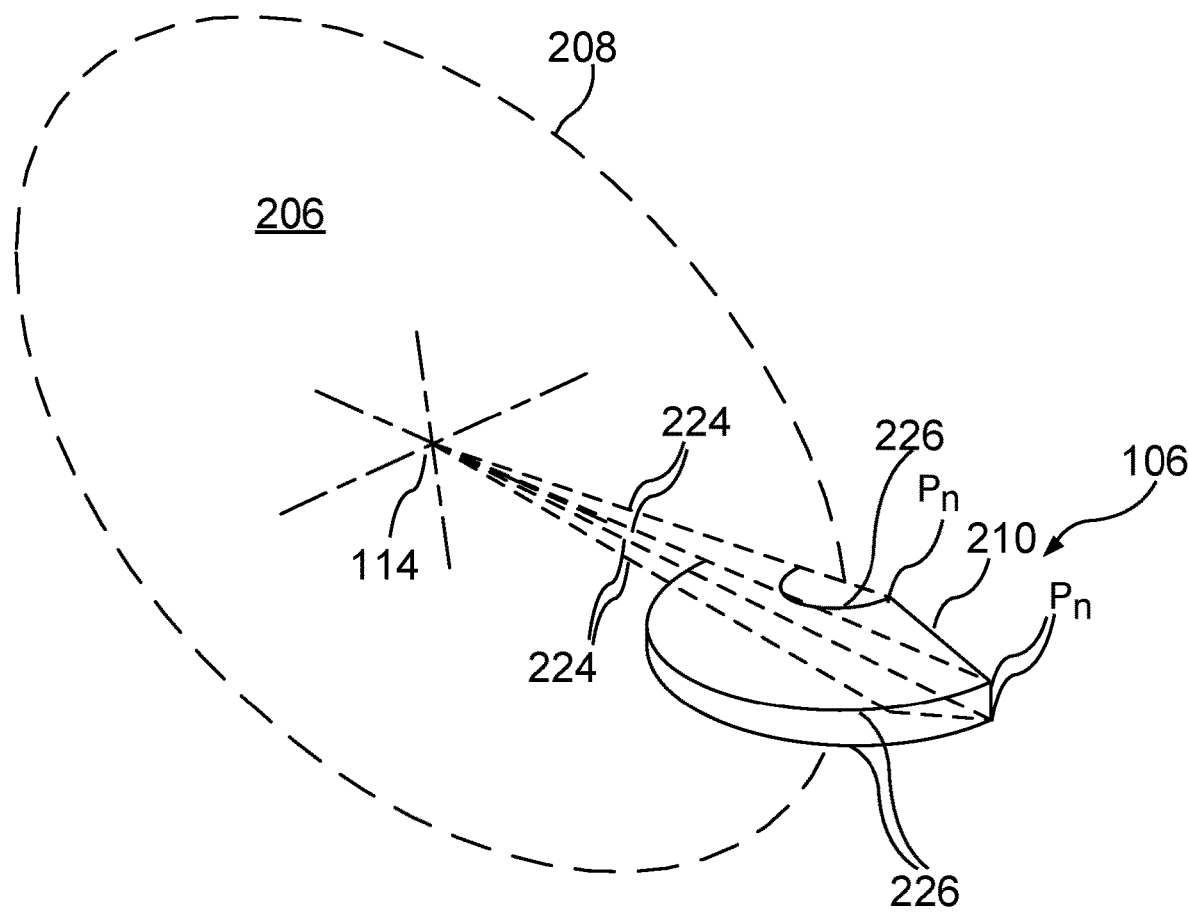

FIG. 2D shows a top view of the gear tooth 106 in which the shape of the gear tooth 106 is defined from the circular paths formed by the rotation of each location $P_n$ of the starting profile 212 in the above-described manner. As FIG. 2D shows, the spacing between the circular paths 226 decrease as with decreasing distance from the axis of gear rotation 214. That is, the cross-sectional width of each gear tooth decreases with decreasing distance from the center of the gear FIG. 2E shows a side view of the gear tooth. Though the gear tooth is depicted as being formed of straight line segments, a curved profile will generate a gear tooth having curved walls.

FIGS. 3A-3B depict another example of a gear tooth 306 in which the outer shape of the gear tooth 306 is defined by a 360° rotation of each location $P_n$ on the starting profile 212 in the above manner. Alternatively, the gear tooth may be defined another range of rotation about the axis and provide a different range of gearing angles.

FIG. 4 shows a top view of the gear tooth 106 formed by rotation in the manner described above. Though a bevel-shaped gear tooth is depicted, other shapes are also within the scope of the embodiment including more rounded shapes.

FIGS. 5A-5B depict a front view of an arrangement of a pair of gears in accordance with an embodiment. Referring to FIG. 5A, the first gear 100 shown in FIG. 1 is depicted meshed with a second gear 102 in which the outer shape of each gear tooth 126 is defined in a manner similar to that of each gear tooth 106 of the first gear 100. Namely, each gear tooth 126 is defined by rotating a starting profile about an axis in the manner described above in connection with FIGS. 2A-2D and 3A-3B.

The second gear 120, which may also be an involute gear, includes a circular base 128 having an inner region 122 and an outer region 124 which comprise a first surface 130 of the second gear 120. Extending from the outer region 124 of the surface 130 are the plurality of gear teeth 126, each of which extends upwards, in part, and outwards, in part, from the surface. Though the first gear 100 and the second gear 120 are shown having a same diameter, other embodiments having first and second gears of unequal diameters are also within the scope of the disclosure.

FIG. 5B is a close-up view of a portion of the meshed first and second gears 100 and 102 shown in FIG. 5A. Particularly, the gear teeth 106 and 126 are shown in close up.

Additionally, in FIG. 5A, the first and second gears 100 and 102 are arranged with the first surfaces of the gears disposed in a same plane, that is, at a 180° gearing intersection angle. However, in accordance with the embodiment, the first and second gears 100 and 102 are able to mesh with each other at any of a range of angles.

FIGS. 6A-6B illustrate another arrangement of the pair of gears 100, 120 shown in FIGS. 5A-5B in which the gear teeth 106 and 126 of the gears 100 and 120, respectively, are meshed at another angle within the 180° range of gearing angles. FIG. 6A also shows the cross-sections 622 and 624 of the gear teeth 106 and 126, respectively, when meshed at the depicted gearing angle. In accordance with an embodiment, the gear 100 is rotatable about a pivot 230a which is tangential to the imaginary circle 208 of the gear 100, and the gear 120 is rotatable about a pivot 230b which is tangential to an imaginary circle (not shown) of the gear 120 and parallel to the pivot 230a. FIG. 6B is a close-up view of the respective cross-sections 622 and 624 of the gear teeth 106 and 126 shown in FIG. 6A.

FIG. 7 show a further arrangement of the pair of gears 100, 120 in which the gear teeth 106 and 126 are meshed at yet another angle within the 180° range of gearing angles. FIG. 7 also illustrates an example of the conditions by which the gears 100, 120 mesh at a range of angles. Specifically, a distance from the pivot 230a associated with the gear 100 to the pivot 230b associated with the gear 120 is fixed. For example, the distance from the pivot 230a to the pivot 230b may be twice the distance from each pivot 230a or 230b to the addendum of their associated gears. Further, a first angle 706 formed between the inner region 102 of the surface 110 of the gear 100 and a mid-plane 710 perpendicular to and bisecting a distance from the pivot 230a to the pivot 230b, and a second angle 716 formed between the inner region 122 of the surface 130 of the gear 120 and the mid-plane 170, each have a same value.

As depicted above, FIGS. 5A-5B show the gears 100, 120 meshing at a gearing intersection angle of 180° wherein the above conditions are met. Moreover, when the above conditions are met, the gears 100, 120 mesh at other gearing intersection angles as depicted in FIGS. 6A-6B and 7.

FIG. 8 shows a side view of an arrangement of the gears 100, 120 meshing at still another gearing angle, and FIG. 9 shows a side view of an arrangement of the gears 100, 120 meshing at a gearing angle of 0°.

FIG. 10 shows a front perspective view of an example of a bracket system 1000 in accordance with an embodiment. The bracket system 1000 may be used, for example, to enable a mounted first roller shade to drive an adjacently mounted roller shade at any of a range of angles between the two roller shades.

The bracket system 1000 incorporates, for example, the gears 100 and 120 described above which are rotatably mounted to brackets 1010 and 1020, respectively. The bracket 1010 may include a gear mounting portion 1012 and a wall mounting portion 1014 and is pivotally mounted about a pivot element 1016 to a back plate 1030. The bracket 1020 may include a gear mounting portion 1022 and a wall mounting portion 1024 and is pivotally mounted about a pivot element 1026 to the back plate 1030. The spacing of the pivots 1016 and 1026, and the angle relations of the surfaces of the gears 100 and 120 with a mid-plane (not shown) between pivots 1016 and 1026 comply with the conditions described above in connection with FIG. 7 so that the gears 100 and 120 can mesh at any of a range of gearing intersection angles about the pivots 1016 and 1026. For example, FIG. 10 shows the gears 100 and 120 meshing at an acute angle.

FIG. 11 shows a top perspective view of the bracket system 1000 arranged at the acute angle shown in FIG. 10.

FIG. 12 shows a front perspective view of an example of the bracket system 1000 of FIG. 10 in which the gears 100 and 120 mesh at a 180° gearing intersection angle, and FIG. 13 shows a top view of the bracket system 1000 arranged at the gearing intersection angle.

FIG. 14 shows a top perspective view of the bracket system 1000 in which the gears 100 and 120 mesh at a gearing intersection angle of 0°.

FIG. 15 depicts a back perspective view of the bracket system 1000 with the gears 100 and 102 meshing at a 180° gearing intersection angle. FIG. 15 also shows the rotation mounts 1040 and 1042 into which the gears 100 and 102 are respectively mounted in the brackets 1010 and 1020. Openings 1044 and 1046 are defined in the back side of the gears 100 and 102, respectively, at the center of the gears and are configured to receive an end of a roller shade or other element that is to be rotatably driven by the gears. Though hexagonal openings are shown, other shapes are also suitable and within the scope of the embodiment.

FIG. 16 depicts a back perspective view of the bracket system 1000 and shows the gears 100 and 102 meshing at another gearing intersection angle.

FIGS. 17-20 illustrate an example of a window shade system 1700 which incorporates the mounting bracket 1000 shown in FIGS. 10-16. The mounting bracket 1000 interconnects a first window shade 1712 with a second window shade 1732 such that a motor (not shown) driving one of the first and second window shades also drives the other of the first and second window shades regardless of the angle formed between the gears of the mounting bracket 1000. As a result, when the motor drives one of the first and second window shades to roll up that shade, the other shade concurrently rolls ups, and when the motor drives one of the first and second window shades to roll down that shade, the other shade concurrently rolls down. Though only two window shades are shown, additional shades may be driven by the same motor using additional mounting brackets 1000 to a further widow shade to one of the first and second window shades.

FIGS. 17A-17B depict front perspective view of the example of the window shade system 1700. A first window frame 1701 is disposed adjacent to a second window frame 1720. The first and second window frames are disposed at an angle with respect to each other. Though the two window frames are shown arranged at an acute angle between them, the two window frames may be arranged any of a range of angles, including being arranged in the same plane (a 180° angle) or at a 90° angle.

A window shade roller 1710 of the first window shade 1712 is rotatably attached to a window frame head 1702 of the first window frame 1701. The window shade roller 1710 is rotatably coupled at one end to an end bracket 1714 which is in turn affixed to the window frame head 1702 of the first window frame 1701. The window shade roller 1710 is attached at another end to a gear of the mounting bracket 1000.

A window shade roller 1730 of the second window shade 1732 is rotatably attached to a window frame head 1722 of the second window frame 1720. The window shade roller 1730 is rotatably attached at one end to an end bracket 1734 which is in turn affixed to the window frame head 1722 of the second window frame 1720. The window shade roller 1730 is attached at another end to another gear of the mounting bracket 1000.

FIG. 17B shows in greater detail the mounting bracket 1000 depicted in FIG. 17A together with cut-away portions of the window frame heads 1702 and 1722 and of the window shade rollers 1710 and 1730. In FIG. 17B, like reference numerals to those of FIGS. 10-16 identify same parts of the mounting bracket 1000. The top wall 1028 of the second plate 1020 of the mounting bracket 1000 is affixed to the window frame head 1702 of the first window frame 1701. The wall mounting portion 1024 of the second plate 1020 may also be attached to another surface of the first window frame 1701. The top wall 1018 of the first plate 1010 of the mounting bracket 1000 is affixed to the window frame head 1722 of the second window frame 1720. The wall mounting portion 1014 of the first plate 1012 may also be attached to another surface of the second window frame 1720.

When one of the window shade rollers 1710, 1730 of the first window and second shades 1712, 1731 is rotated, such as using a motor (not shown), the end connected to one of the gears of the mounting bracket 1000 similarly rotates and causes the other gear to rotate, which in turn rotates the window shade roller attached to that gear. In this manner, a motor driving one of the window shades may be used to drive one or more additional roller shades.

FIG. 18A shows a frontal perspective view from above of the window shade system 1700 depicted in FIG. 17A. FIG. 18B shows in greater detail the mounting bracket 1000 as depicted in FIG. 18A together with cut-away portions of the window frame heads 1702 and 1722 and of the window shade rollers 1710 and 1730.

FIG. 19A shows a frontal perspective view from below of the window shade system 1700 depicted in FIG. 17A. FIG. 19B shows in greater detail the mounting bracket 1000 as depicted in FIG. 19A together with cut-away portions of the window frame heads 1702 and 1722 and of the window shade rollers 1710 and 1730.

FIG. 20 shows a bottom perspective view of the window shade system 1700 depicted in FIG. 17A.

In each of FIGS. 17A-17B, 18A-18B, 19A-19B and 20, like reference numerals identify like parts.

Because the mounting bracket 1000 is operable any of a range of gear angles, such as from 0° to 180°, the mounting bracket 1000 is suitable for use with adjacent windows at any of a corresponding range of angles. Therefore, the need for providing specific gear arrangements designed only for a specific gear angle is eliminated.

INDUSTRIAL APPLICABILITY

To solve the aforementioned problems, the present embodiments provide a gear system and bracket system which permit adjacent motorized roller shades to be driven by a single motor regardless of the angle between the adjacent roller shades.

Alternate Embodiments

Alternate embodiments may be devised without departing from the spirit or the scope of the embodiments.

What is claimed is:
1. A gear, comprising:
 (a) a circular base having a front surface that includes an inner region and an outer region that surrounds the inner region, the circular base being rotatable about a central axis, and
 (b) a plurality of gear teeth arranged in a same row and extending outward from the outer region of the front surface and being evenly spaced from each other along a plurality of locations on the outer region of the front surface, each gear tooth having a cross-sectional width that varies with decreasing distance from the central axis of the gear in a manner that, and having an outer shape configured in a manner that together permit any one of the ear teeth in the row of ear teeth to contact and directly mesh with an one of the gear teeth in a corresponding row of gear teeth of a substantially identical gear for any gear angle within a predefined range of gear angles between the central axis of the ear and the central axis of the substantially identical gear; wherein

(c) the outer shape of each gear tooth of the plurality of gear teeth is defined by independently rotating each one of a plurality of locations on a starting profile associated with that gear tooth, the starting profile being initially disposed in a reference plane that is perpendicular to the central axis of the circular base and extending outward from the central axis of the circular base.

2. The gear of claim 1, wherein
(a) using a common reference circle that is concentric with the central axis and located in the reference plane, and using a plurality of imaginary rays that are located in the reference plane, each one of the plurality of imaginary rays being respectively associated with a corresponding one of the plurality of locations on the starting profile, and extending from the central axis of the circular base to its corresponding location on the starting profile,
  (i) a plurality of axes of rotation is defined that are respectively associated with the corresponding ones of the plurality of locations on the starting profile, each axis of rotation being tangential to the reference circle at the intersection of its corresponding imaginary ray with the reference circle, and
  (ii) each location on the starting profile is rotated out of the reference plane about its corresponding axis of rotation while its distance from the corresponding axis of rotation remains fixed.

3. The gear of claim 2, wherein
(a) the respective paths traversed by the plurality of locations on the starting profile combine to define the outer shape of the gear tooth and become closer to each other as the plurality of locations are rotated.

4. The gear of claim 1, wherein the starting profile is an involute profile.

5. The gear of claim 1, wherein the inner region of the front surface is planar.

6. The gear of claim 5, wherein the outer region of the front surface curves away from the planar inner region.

7. A gear, comprising:
(a) a circular base having a front surface that includes an inner region and an outer region that surrounds the inner region, the circular base being rotatable about a central axis; and
(b) a plurality of gear teeth arranged in a same row and extending outward from the outer region of the front surface and being evenly spaced from each other along a plurality of locations on the outer region of the front surface, each gear tooth having a cross-sectional width that varies with decreasing distance from the central axis of the gear in a manner that, and having an outer shape configured in a manner that together permit any one of the gear teeth in the row of gear teeth to contact and directly mesh with any one of the gear teeth in a corresponding row of gear teeth of a substantially identical gear for any gear angle within a predefined range of gear angles between the central axis of the ear and the central axis of the substantially identical gear; wherein
(c) the outer shape of each gear tooth of the plurality of gear teeth is defined using a common reference plane perpendicular to the axis of gear rotation and a common reference circle disposed in the reference lane and concentric with the axis of ear rotation, and
(d) for each gear tooth of the plurality of gear teeth,
  (1) a starting profile for that gear tooth is defined in the reference plane and extends outward from the reference circle,
  (2) for each one of a plurality of locations on the starting profile of that gear tooth,
    (A) a corresponding imaginary ray is associated with that location on the starting profile, the corresponding imaginary ray being defined in the reference plane and extending from the axis of gear rotation to that location on the starting profile,
    (B) a corresponding further axis is associated with that location on the starting profile, the corresponding further axis being tangential to the reference circle at the intersection of the corresponding imaginary ray and the reference circle, and
    (C) the location on the starting profile is rotated out of the reference plane about its corresponding further axis while its distance from the further axis remains fixed, the respective path traversed by that location as it is rotated defining a portion of the outer shape of the gear tooth,
  (3) whereby the respective paths traversed by the plurality of locations on the starting profile combine to define the outer shape of that gear tooth.

8. The gear of claim 7, wherein
(a) for a first one of the plurality of locations on the starting profile that is a given distance from its corresponding further axis, and for a second one of the plurality of locations on the starting profile that is also that distance from its corresponding further axis, the respective paths traversed by the rotations of the first and second locations become closer to each other as distance from the axis of gear rotation decreases.

9. The gear of claim 7, wherein the starting profile is an involute profile.

10. A gear system, comprising:
(a) first and second gears, each one of the first and second gears including:
  (1) a circular base having a front surface that includes an inner region and an outer region that surrounds the inner region, the circular base being rotatable about a central axis, and
  (2) a plurality of gear teeth arranged in a same row and extending outward from the outer region of the front surface and being evenly spaced from each other along a plurality of locations on the outer region of the front surface,
  (3) each gear tooth of the plurality of gear teeth having a cross-sectional width that varies with decreasing distance from the central axis of that gear in a manner that, and having an outer shape configured in a manner that together permit any one of the gear teeth in a row of gear teeth of one of the first and second gears to contact and directly mesh with any one of the gear teeth in a corresponding row of gear teeth of another one of the first and second gears for any gear angle within a predefined range of gear angles between the central axis of the first gear and the central axis of the second gear; wherein
(b) using a common reference plane perpendicular to the axis of gear rotation of the first gear, and a common reference circle disposed in the reference plane and concentric with the axis of gear rotation of the first gear,
  (1) a first pivot is coupled to the first gear and located tangential to the reference circle of the first gear at a first distance from the axis of gear rotation of the first gear such that the entire first gear is movable in a same direction at least within a first range of angles about the first pivot; and
(c) using a common reference plane perpendicular to the axis of gear rotation of the second gear, and a common reference circle disposed in the reference plane and concentric with the axis of gear rotation of the second gear,
  (1) a second pivot is parallel to the first pivot, the second pivot being coupled to the second gear and located tangential to the reference circle of the second gear at a second distance from the axis of gear rotation of the second gear such that the entire second gear is movable in a same direction at least within a second range of angles about the second pivot;
(d) wherein a distance between the first pivot and the second pivot is fixed, and
(e) a first angle formed between the inner region of the front surface of the first gear and a mid-plane perpendicular to and bisecting an imaginary line extending from the first pivot to the second pivot, and a second angle formed between the inner region of the front surface of the second gear and the mid-plane, each have a same value, so that for any angle within the first range of angles, the gear tooth of the first gear meshes with the gear tooth of the second gear at a corresponding angle within the second range of angles.

11. The gear system of claim 10, wherein for each one of the first and second gears,
(a) the outer shape of each gear tooth of the plurality of gear teeth is defined using a common reference plane perpendicular to the axis of gear rotation, and a common reference circle disposed in the reference plane and concentric with the axis of gear rotation.

12. The gear system of claim 11, wherein
(a) for each gear tooth of the plurality of gear teeth,
  (1) a starting profile for that gear tooth is defined in the reference plane and extends outward from the reference circle,
  (2) for each one of a plurality of locations on the starting profile of that gear tooth,
    (A) a corresponding imaginary ray is associated with that location on the starting profile, the corresponding imaginary ray being defined in the reference plane and extending from the axis of gear rotation to that location on the starting profile,
    (B) a corresponding further axis is associated with that location on the starting profile, the corresponding further axis being tangential to the reference circle at the intersection of the corresponding imaginary ray and the reference circle, and
    (C) the location on the starting profile is rotated out of the reference plane about its corresponding further axis while its distance from the further axis remains fixed, the respective path traversed by that location as it is rotated defining a portion of the outer shape of the gear tooth,
  (3) whereby the respective paths traversed by the plurality of locations on the starting profile combine to define the outer shape of that gear tooth.

13. The gear system of claim 12, wherein
(a) for a first one of the plurality of locations on the starting profile that is a given distance from its corresponding further axis, and for a second one of the plurality of locations on the starting profile that is also that distance from its corresponding further axis, the respective paths traversed by the rotations of the first and second locations become closer to each other as distance from the axis of gear rotation decreases.

14. The gear system of claim 13, wherein the starting profile of each of the first and second gears is an involute profile.

* * * * *